United States Patent
Sakamoto

(10) Patent No.: US 7,131,773 B2
(45) Date of Patent: Nov. 7, 2006

(54) LENS BARRELS

(75) Inventor: Takamasa Sakamoto, Osaka (JP)

(73) Assignees: Asia Optical Co., Inc., Taichung (TW); Optek Corporation, Osaka (JP)

( * ) Notice: Subject to any disclaimer, the term of this patent is extended or adjusted under 35 U.S.C. 154(b) by 198 days.

(21) Appl. No.: 11/018,787

(22) Filed: Dec. 21, 2004

(65) Prior Publication Data

US 2005/0254815 A1   Nov. 17, 2005

(30) Foreign Application Priority Data

May 14, 2004   (JP)   ............................. 2004-144654

(51) Int. Cl.
*G03B 9/08*   (2006.01)
*G03B 17/00*   (2006.01)
(52) U.S. Cl. ...................... 396/462; 396/542
(58) Field of Classification Search ............... 396/451, 396/462, 542
See application file for complete search history.

(56) References Cited

U.S. PATENT DOCUMENTS 4,596,454 A * 6/1986 Kawai et al. ............... 396/532

6,835,006 B1 * 12/2004 Tanaka et al. ............... 396/349

FOREIGN PATENT DOCUMENTS

JP   2003-140022   5/2003

* cited by examiner

*Primary Examiner*—W. B. Perkey
(74) *Attorney, Agent, or Firm*—Thomas, Kayden, Horstemeyer & Risley

(57) ABSTRACT

A lens barrel with a shutter unit. While the lens barrel is retracted to obtain a collapsed state or advanced to obtain a photographing state, the flexible printed circuit board of the shutter unit is bendable so as to provide a variable length for the rotation of the shutter unit 71 around the rotary axis J2 parallel with the optical axis J1. When the lens barrel is operated in the photographing state, the flexible printed circuit board is foldable so as to provide a variable length for the movement of the shutter unit 71 in the optical axis J1. The flexible printed circuit board can support flexibly without twisting and loosening. The lens barrel further includes a restraint member to bring the shutter unit 71 rotating around the central axis and to restrain the rotation of the shutter unit 71.

6 Claims, 29 Drawing Sheets

LENS BARRELS

BACKGROUND

The invention relates to lens barrels, and in particular, to lens barrels with a shutter unit which is held in a moveable manner.

In a camera, a control circuit transmits signals via a flexible printed circuit board to drive a shutter unit disposed in the lens barrel. When the shutter unit is moved along an optical axis of the lens barrel, the sufficient length of the flexible printed circuit board is capable of holding the shutter unit without generating loose.

When the shutter unit rotates around the central axis of the lens barrel, the flexible printed circuit board may break or interfere with other members in the lens barrel. Accordingly, in Japan Pub. No. 2003-140022, the shutter unit is a non-rotary member such that it can move simply along the optical axis.

Nevertheless, to obtain a thinner, miniaturized lens barrel, the flexible printed circuit board and the shutter unit must rotate together. That is, if the shutter unit can only move in the lens barrel, it may be difficult to miniaturize and thin the lens barrel.

SUMMARY

A lens barrel is provided. An exemplary embodiment of a lens barrel comprises a shutter unit, a driving mechanism, and a flexible printed circuit board. The shutter unit comprises a shutter blade and an actuator. The driving mechanism drives the shutter unit to move along an optical axis and rotate around a rotary axis parallel with the optical axis in the lens barrel. The flexible printed circuit board comprises a first flexible portion and a second flexible portion and connects the actuator of the shutter unit and a driving circuit outside of the lens barrel. The first flexible portion is foldable so as to provide a first variable length for the movement of the shutter unit along the optical axis. The second flexible portion is bendable so as to provide a second variable length for the rotation of the shutter unit around the rotary axis parallel with the optical axis.

Additionally, the lens barrel further comprises a restraint member bringing the shutter unit rotating around a central axis of the lens barrel and restraining the rotation of the shutter unit. The flexible printed circuit board further comprises a central portion located between the first flexible portion and the second flexible portion. The central portion is fixed to the restraint member.

Furthermore, the lens barrel is retracted to obtain a collapsed state and advanced to obtain a photographing state. The shutter unit is moved and rotated by the driving mechanism when the lens barrel is operated from the collapsed state to the photographing state, and is simply moved when the lens barrel is operated in the photographing state.

DESCRIPTION OF THE DRAWINGS

The invention can be more fully understood by reading the subsequent detailed description and examples with references made to the accompanying drawings, wherein.

DETAILED DESCRIPTION

FIGS. 1–29 show an embodiment of a lens barrel 2, applied here in a digital camera with zoom function.

Figure 1:
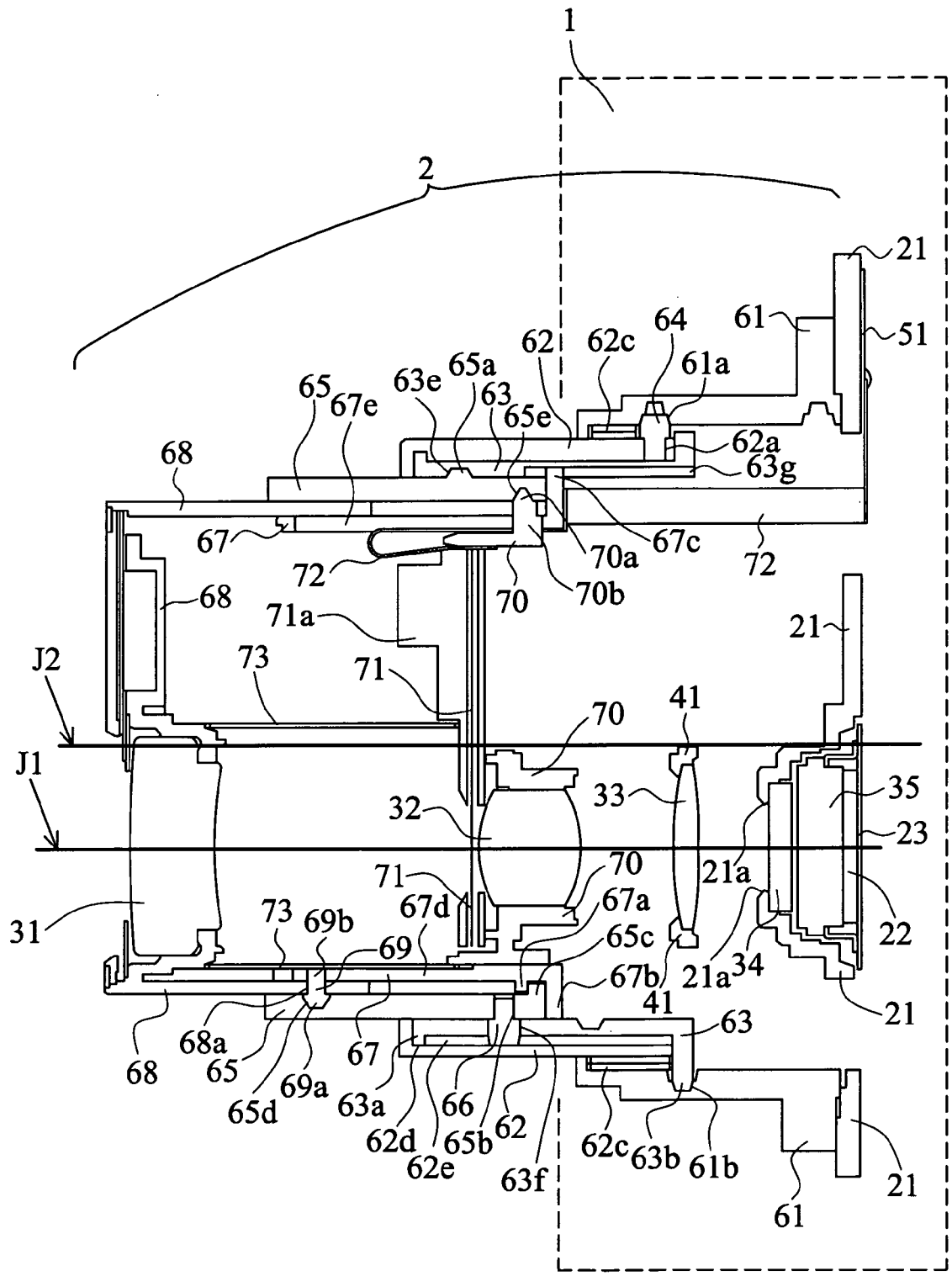
FIG. 1 is a cross section of an embodiment of a lens barrel in a photographing state in minimum zoom state.

FIG. 1 is a cross section of the lens barrel 2 in a photographing state in a minimum zoom state. A photographic optical system comprises a first lens group 31, a second lens group 32, a third lens group 33, a low pass filter 34, and a charge coupled device (CCD) 35 arranged consecutively from a side nearest an object to be photographed. The CCD 35 is used as an image-generating device. J1 represents an optical axis of the photographic optical system. The optical axis J1 is parallel to a central axis J2 of the lens barrel 2, and is eccentric from the central axis J2. Zoom operation is accomplished by moving the first and second lens groups 31 and 32 along the optical axis J1. Focus operation is accomplished by moving the third lens group 33 along the optical axis J1. A light from the side nearest the object reaches the CCD 35 via the first lens group 31, the second lens group 32, the third lens group 33, and the low pass filter 34 consecutively. In the following description, an optical axis direction means a direction that is parallel to the optical axis J1.

A fixed barrel 61 is fixed to the body 1. A CCD holder 21 is fixed to the fixed barrel 61 to cover an opening of the fixed barrel 61. The low pass filter 34 is disposed in front of the CCD 35, and supported at an opening portion 21a of the CCD holder 21. The CCD 35 is supported along with a heat-dissipation plate 22, and fixed to the CCD holder 21 via the heat-dissipation plate 22. A flexible printed circuit board 23 for the CCD 35 is located behind the heat-dissipation plate 22, to transmit an electronic signal from the CCD 35.

Figure 2:
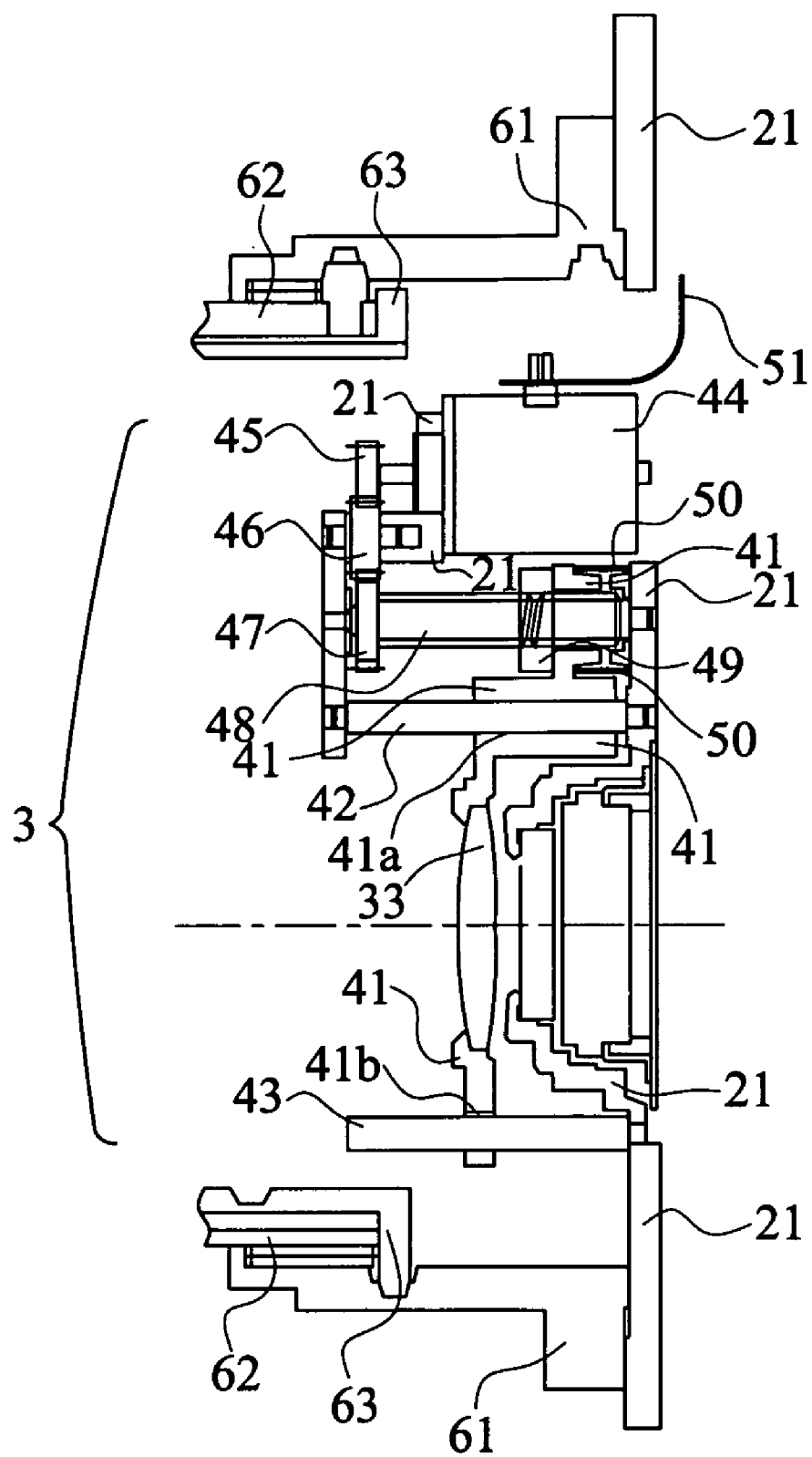
FIG. 2 is a cross section of a focus driving mechanism of the lens barrel in FIG. 1.

The third lens group 33 and a focus driving mechanism 3 for driving the third lens group 33 are assembled with respect to the CCD holder 21. FIG. 2 is a cross section of the focus driving mechanism 3. A third lens frame 41 for supporting the third lens group 33 is slidably supported in the optical axis direction via a pair of guide shafts 42 and 43 disposed on the CCD holder 21. The guide shaft 42 is the main guide shaft of the third lens frame 41. The guide shaft 43 limits the rotation of the third lens frame 41, and is slidably inserted into guide holes 41a and 41b on the third lens frame 41.

A focus motor 44 is disposed on the side of the CCD 35 and the third lens group 33. The focus motor 44 is also located inside the fixed barrel 61, and fixed with respect to the CCD holder 21. The rotational driving force of the focus motor 44 is transmitted to a screw shaft 48 via a focus motor gear 45, focus gears 46 and 47. The third lens frame 41 moves forward/backward along the optical axis direction by means of the screwing relationship between the screw shaft 48 and a nut 49. Since the rotational driving force of the focus motor 44 is decelerated by the focus gears 46 and 47, the screw shaft 48 receives sufficient rotary torque. The third lens frame 41 is biased along the optical axis direction by a spring 50. The focus motor 44 is controlled by a control circuit of the camera via a flexible printed circuit board 51 located behind the CCD holder 21.

Figure 3:
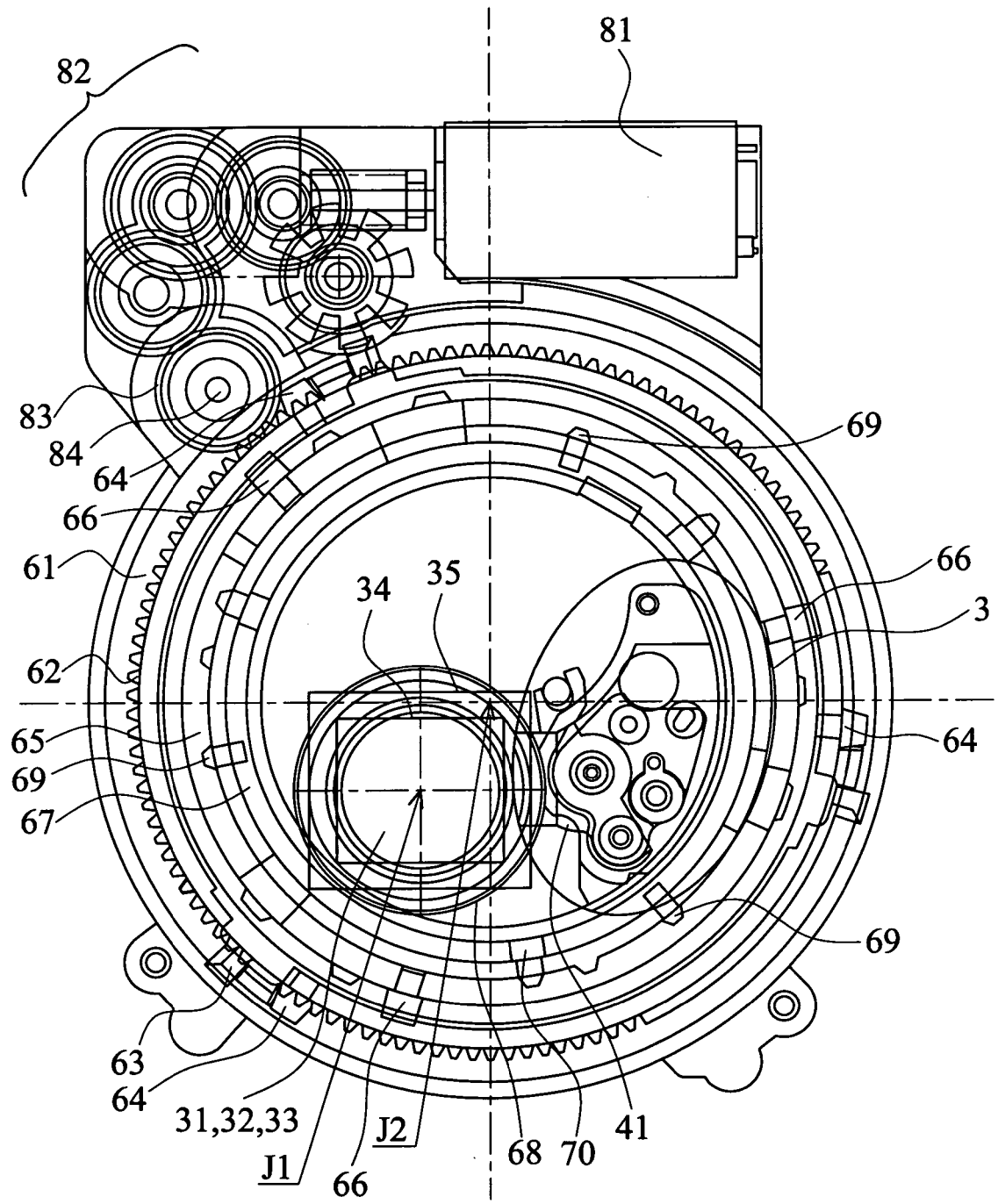
FIG. 3 is a front perspective view of the lens barrel in the photographing state.

FIG. 3 is a front perspective view of the lens barrel 2 in the photographing state. A zoom motor 81 and a deceleration gear train 82 are located above the fixed barrel 61. The driving force of the zoom motor 81 is transmitted to a zoom gear 83 via the deceleration gear train 82. The zoom gear 83 is supported by a gear shaft 84 parallel to the optical axis direction, and rotates with respect to the fixed barrel 61. The zoom motor 81, the deceleration gear 82, and the zoom gear 83 drive the expansion mechanism of the lens barrel 2. The zoom motor 81 is controlled by the control circuit of the camera via the flexible printed circuit board 51 located behind the CCD holder 21.

Figure 4:
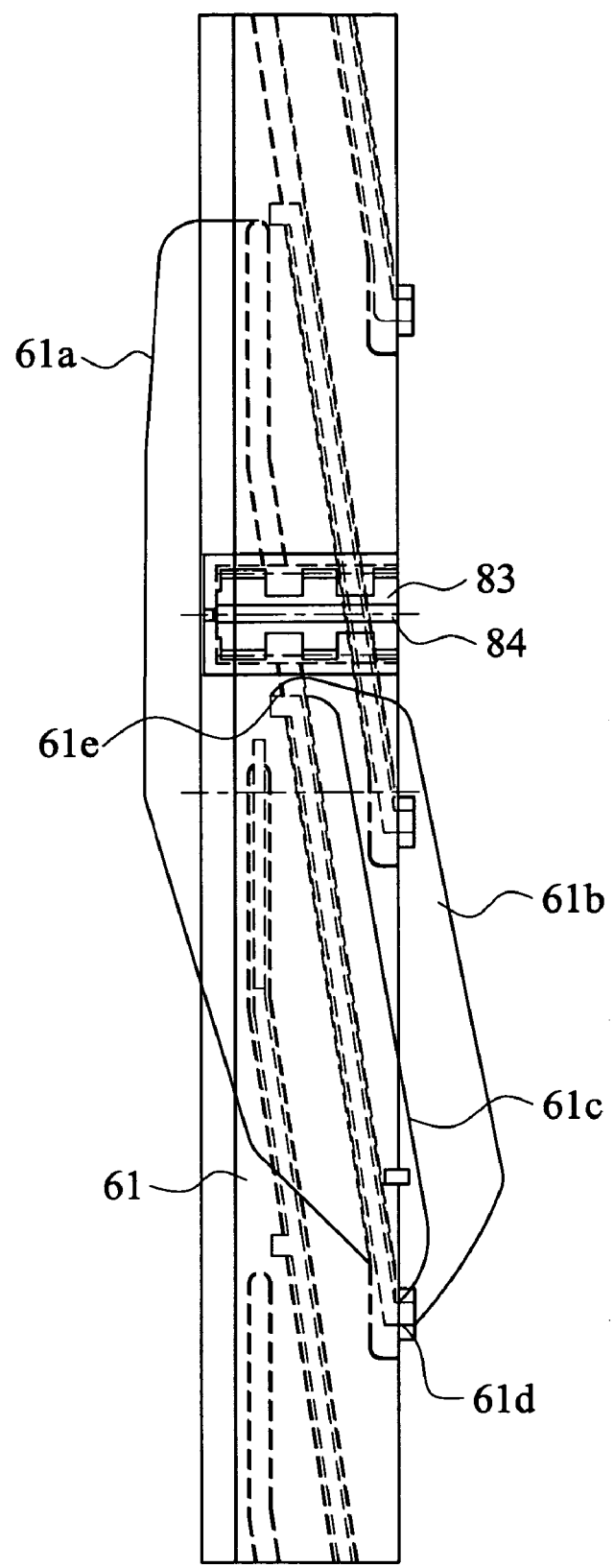
FIG. 4 is a schematic view of a fixed barrel from the outer periphery thereof.
Figure 5:
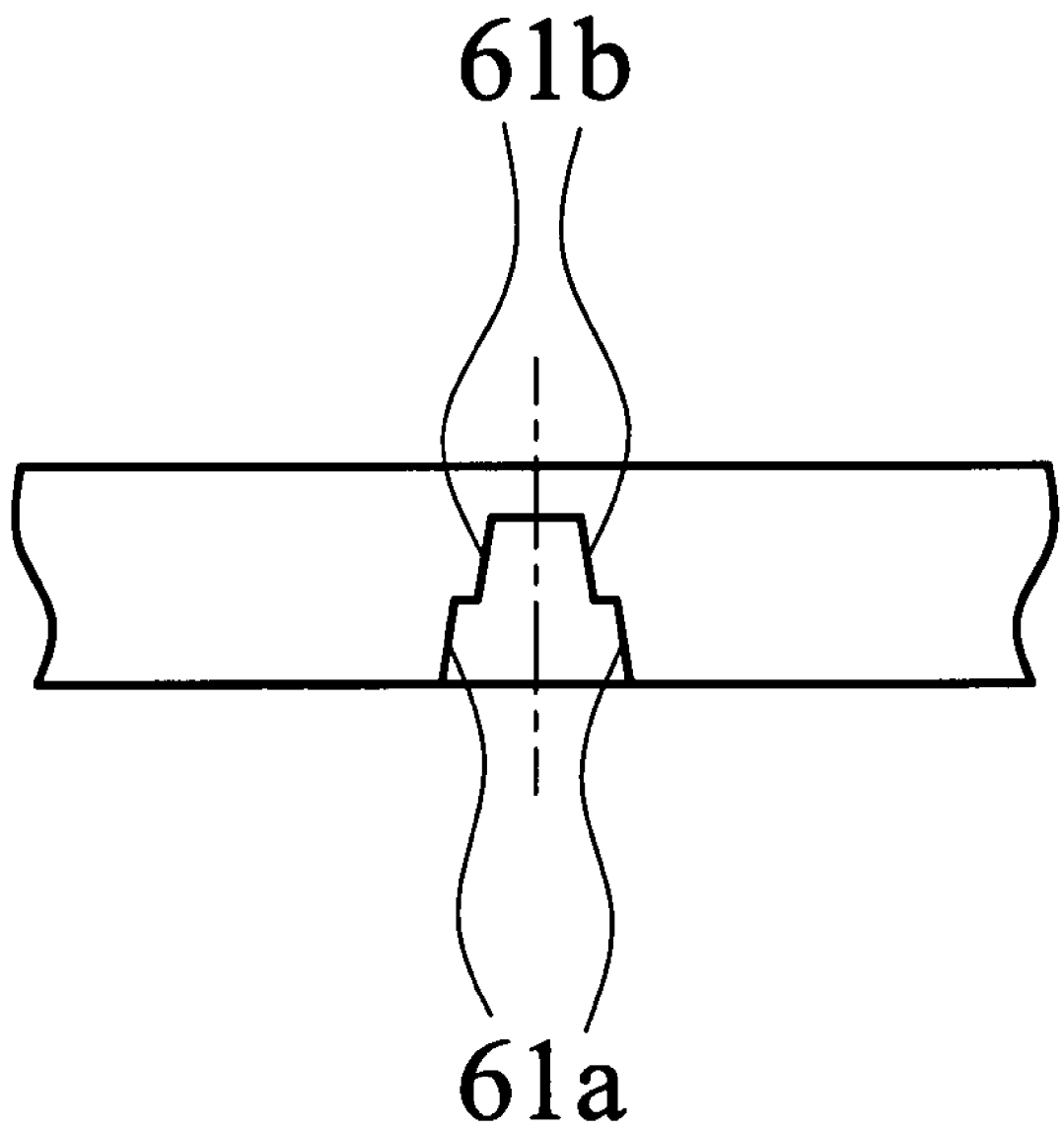
FIG. 5 is a cross section of a cam groove of the fixed barrel.

FIG. 4 is a schematic view of the fixed barrel 61 from the outer periphery thereof. Three cam grooves 61a, for guiding a rotary barrel 62, and three cam grooves 61b, for guiding a restraining barrel 63, are formed at the inner periphery of the fixed barrel 61. The cam grooves 61a are deeper than the cam grooves 61b. The cam grooves 61a and 61b comprise the same area 61c with same cam trajectory. A cam groove shaped as shown in FIG. 5 is formed in area 61c.

Figure 6:
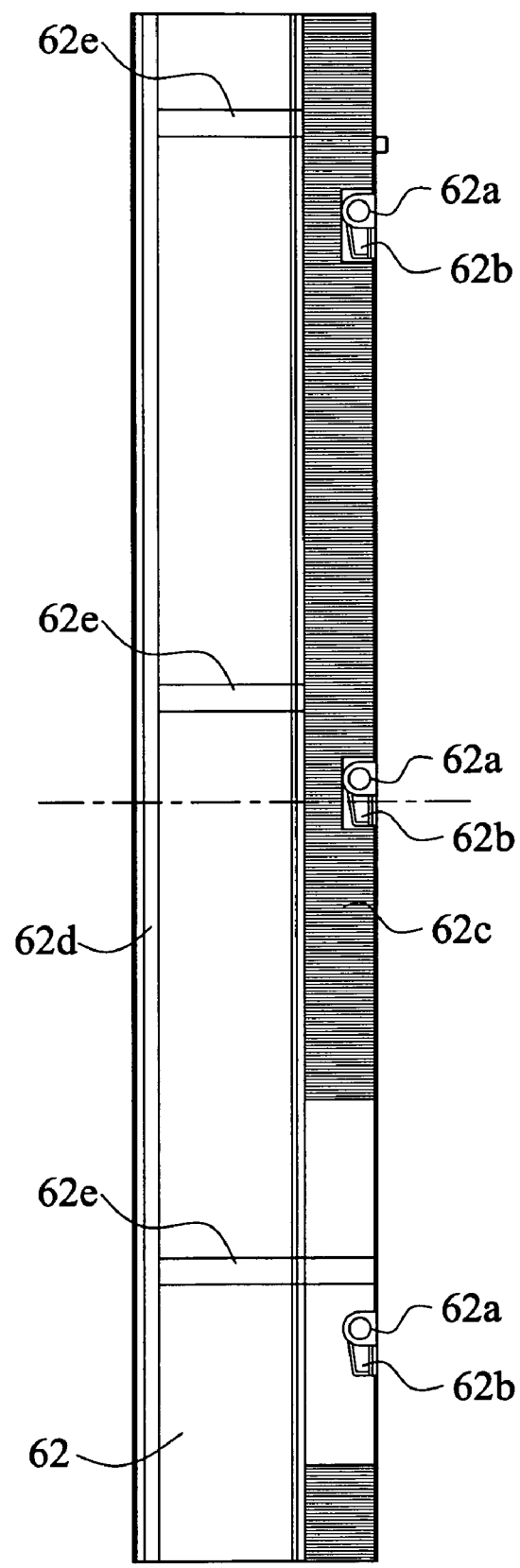
FIG. 6 is a schematic view of a rotary barrel from the outer periphery thereof.

FIG. 6 is a schematic view of the rotary barrel 62 from the outer periphery thereof. The rotary barrel 62 is located inside the fixed barrel 61, and comprises holes 62a. Three follower pins 64 are inserted into the holes 62a, engaging with the cam grooves 61a of the fixed barrel 61. Protrusions 62b are formed at the outer periphery of the rotary barrel 62 around the inserted follower pins 64, and shaped to be substantially engaged with the cam grooves 61a of the fixed barrel 61. A gear portion 62c is disposed at the outer periphery of the rotary barrel 62 to mesh with the zoom gear 83. The rotational driving force is transmitted by the driving mechanism, comprising the zoom motor 81, the deceleration gear 82, and the zoom gear 83. The rotary barrel 62 is rotated around the central axis J2 by the rotation of the zoom gear 83, such that the rotary barrel 62 is driven forward/backward along the cam grooves 61a of the fixed barrel 61.

Figure 7:
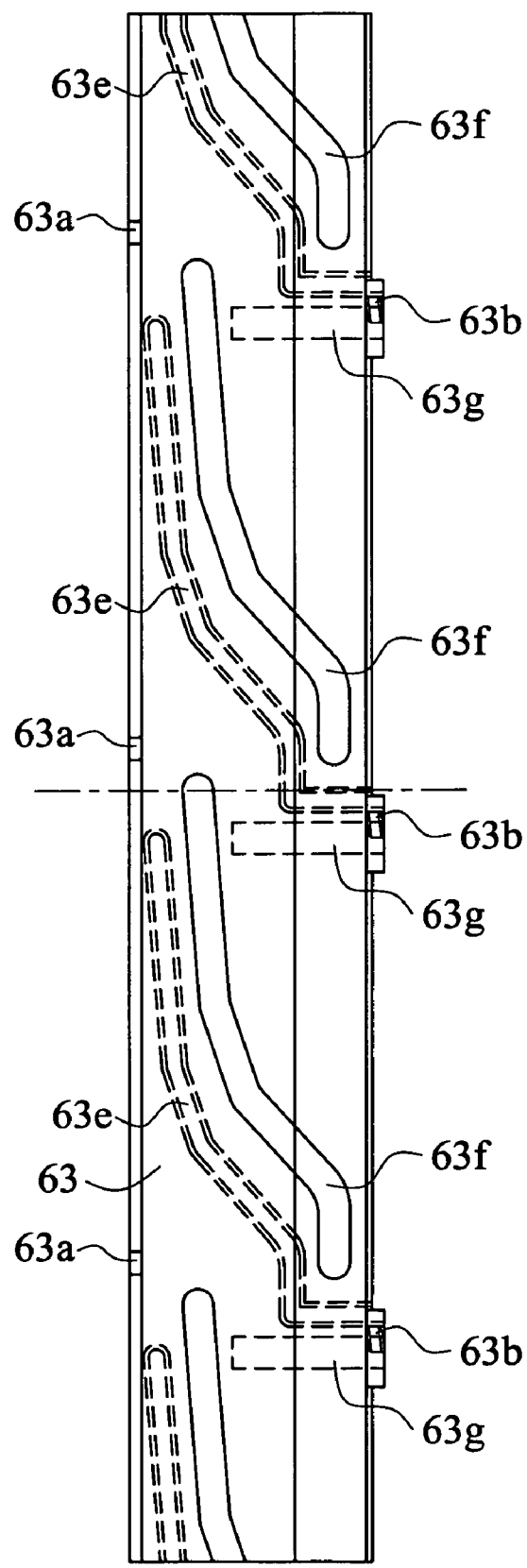
FIG. 7 is a schematic view of a restraining barrel from the outer periphery thereof.
Figure 8:
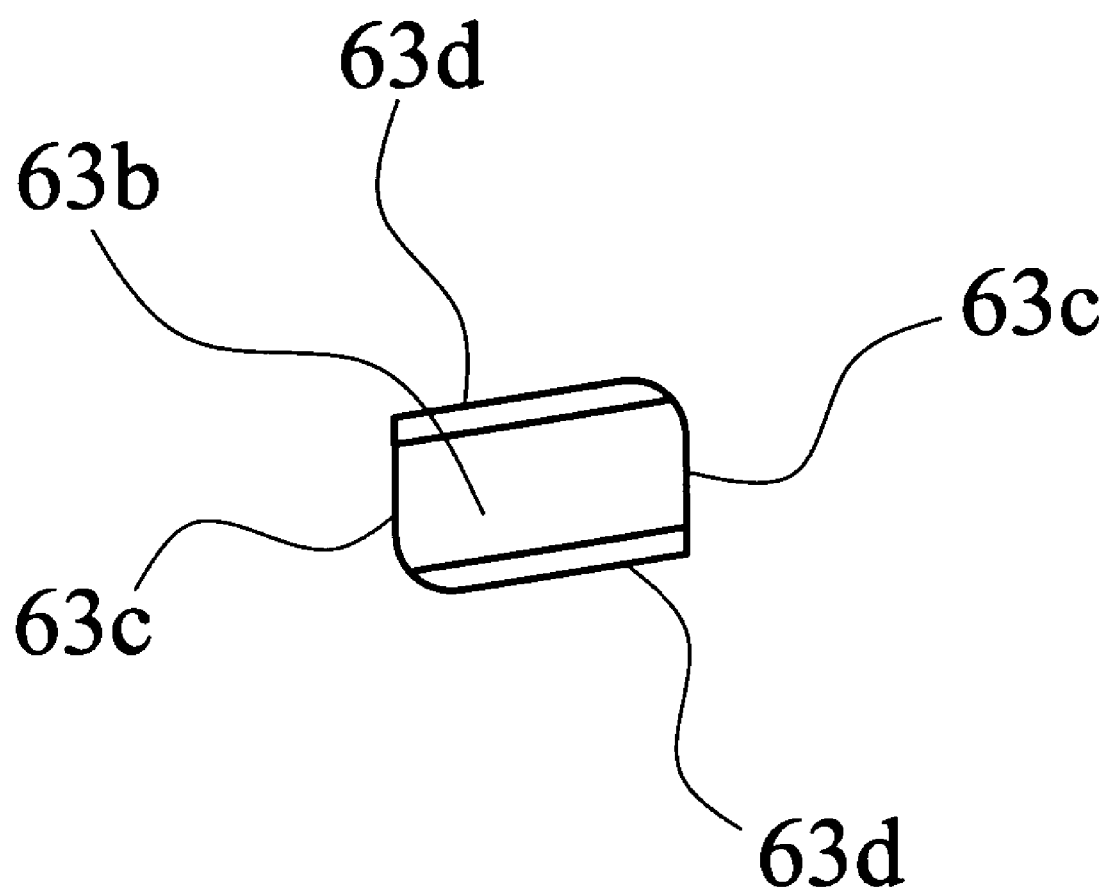
FIG. 8 is a cross section of a cam follower of the restraining barrel.

FIG. 7 is a schematic view of the restraining barrel 63 from the outer periphery thereof. The restraining barrel 63 is located inside the rotary barrel 62. Claws 63a, disposed at the outer periphery of the restraining barrel 63, engage with grooves 62d formed at the inner periphery of the rotary barrel 62. The restraining barrel 63 is rotatably supported, and movement thereof is limited to the optical axis direction with respect to the rotary barrel 62. Three cam followers 63b are formed at the outer periphery of the restraining barrel 63 to engage with the cam grooves 61b of the fixed barrel 61. The cam follower 63b of the restraining barrel 63 has a parrallelogram cross section as shown in FIG. 8. Each cam follower 63b comprises a flat surface 63c, engaging straight areas 61d and 61e of the cam groove 61b of the fixed barrel 61, and a flat surface 63d engaging with inclined areas 61c of the cam groove 61b of the fixed barrel 61.

Figure 9:
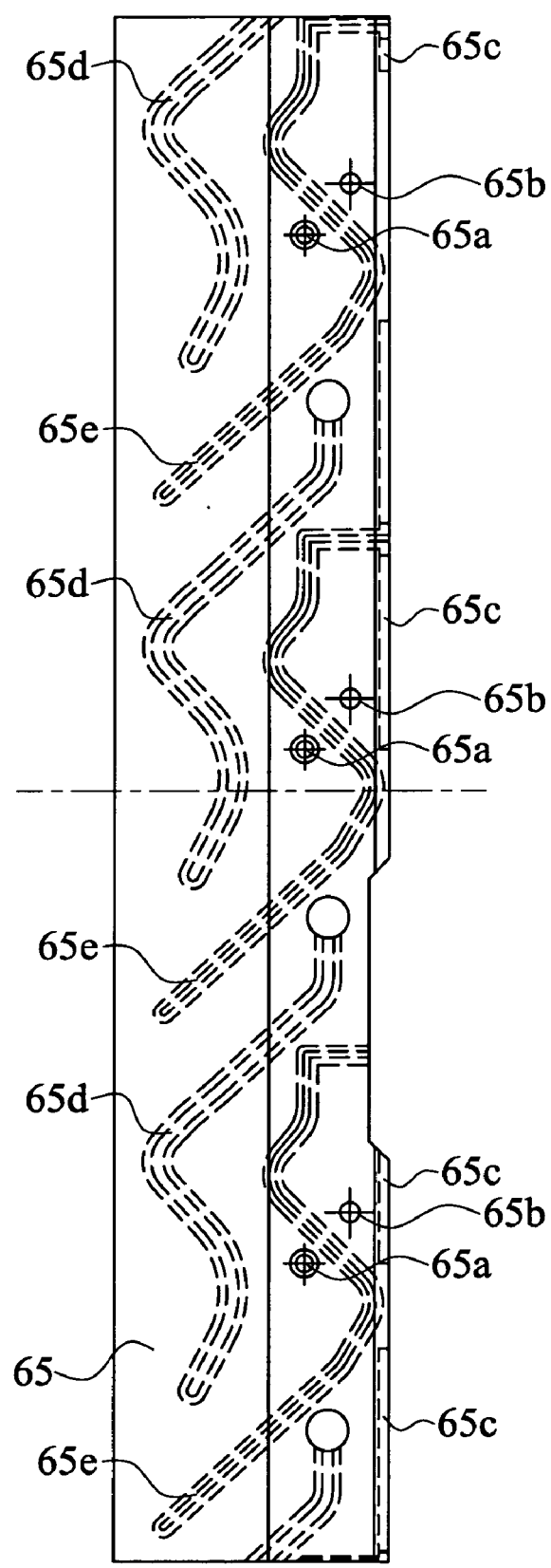
FIG. 9 is a schematic view of a cam barrel from the outer periphery thereof.

FIG. 9 is a schematic view of a cam barrel 65 from the outer periphery thereof. The cam barrel 65 is located inside the restraining barrel 63, and comprises three cam followers 65a at the outer periphery. The cam followers 65a engage the cam grooves 63e disposed at the inner periphery of the restraining barrel 63. The cam barrel 65 is driven forward/backward via the cam grooves 63e of the restraining barrel 63 by means of the rotation of the cam barrel 65 with respect to the restraining barrel 63. Three guiding shafts 66 are inserted into holes 65b of the cam barrel 65 through the holes 63f of the restraining barrel 63 to engage forward grooves 62e disposed at the inner periphery of the rotary barrel 62 along the optical axis direction. Thus, the cam barrel 65 cannot rotate with respect to the rotary barrel 62, but can move with respect to the rotary barrel 62 along the optical axis direction. That is, the restraining barrel 63 can rotate with respect to the rotary barrel 62. The cam barrel 65 is driven forward/backward along the cam grooves 63e of the restraining barrel 63.

Figure 10:
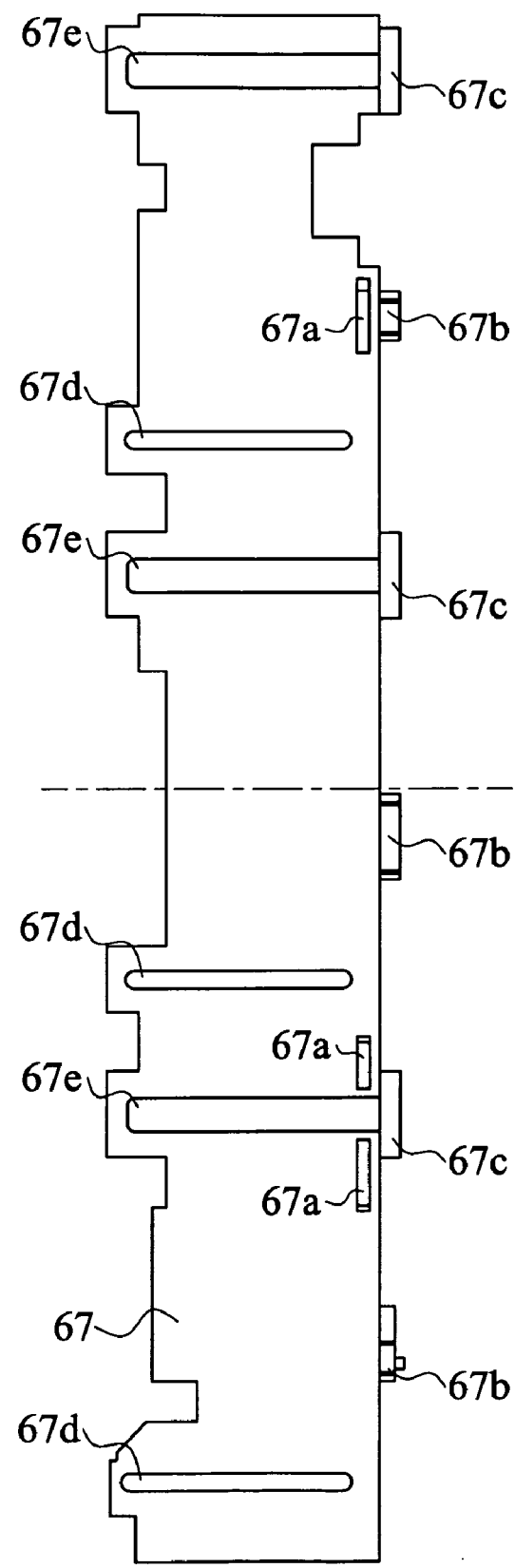
FIG. 10 is a schematic view of a forward barrel from the outer periphery thereof.

FIG. 10 is a schematic view of a forward barrel 67 from the outer periphery thereof. The forward barrel 67 is located inside the cam barrel 65. The movement of claws 65c, disposed at the inner periphery of the cam barrel 65, to the optical axis direction is limited by clipping the claws 65c between protrusions 67a and 67b disposed at the outer periphery of the forward barrel 67. The forward barrel 67 is supported to be rotatable with respect to the cam barrel 65. Guide claws 67c, disposed at the outer periphery of the forward barrel 67, engage with forward grooves 63g disposed at the inner periphery of the restraining barrel 63 along the optical axis direction. Thus, the forward barrel 67 cannot rotate with respect to the restraining barrel 63, but can move with respect to the restraining barrel 63 along the optical axis direction.

Figure 11:
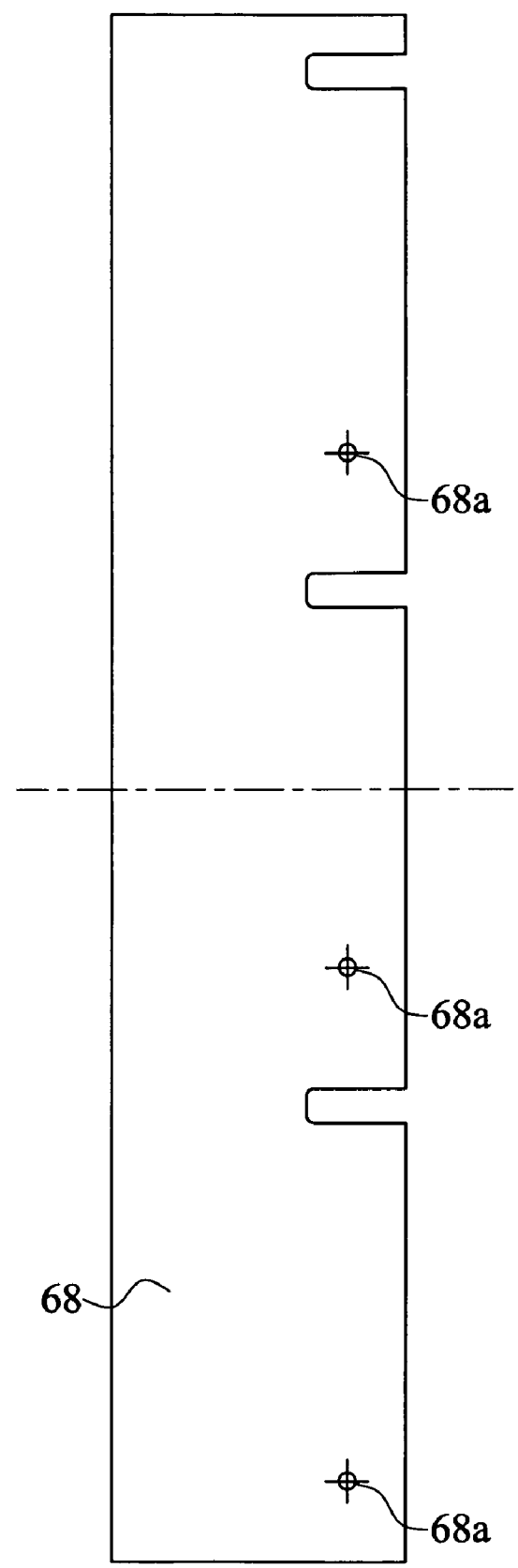
FIG. 11 is a schematic view of a first lens frame from the outer periphery thereof.

FIG. 11 is a schematic view of a first lens frame 68 from the outer periphery thereof. The first lens frame 68 is located inside the cam barrel 65 to support the first lens group 31. Three follower pins 69 are inserted into holes 68a of the first lens frame 68. A follower portion 69*a*, formed at the outer periphery of the follower pin 69, engages the cam groove 65*d* disposed at the inner periphery of the cam barrel 65. A guide portion 69*d*, disposed at the inner periphery of the follower pin 69, engages a guide hole 67*d* of the forward barrel 67 along the optical axis direction. Thus, the first lens frame 68 is driven forward/backward along the cam groove 65*d* of the cam barrel 65 in the optical axis direction by means of the rotation of the forward barrel 67 with respect to the cam barrel 65, and the rotation of the cam barrel 65 with respect to the restraining barrel 63. That is, the first lens frame 68 is not moved, with respect to the restraining barrel 63, by the rotation of the forward barrel 67.

Figure 12:
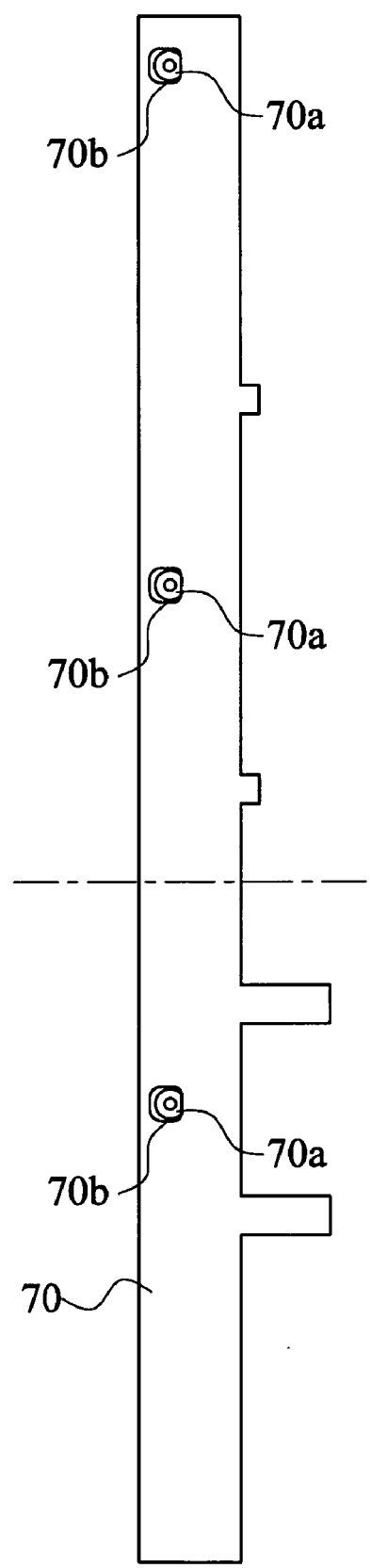
FIG. 12 is a schematic view of a second lens frame from the outer periphery thereof.

FIG. 12 is a schematic view of a second lens frame 70 from the outer periphery thereof. The second lens frame 70 is located inside the forward barrel 67 to support the second lens group 32. Three cam followers 70*a* are formed at the outer periphery of the second lens frame 70, and engage the cam grooves 65*e* disposed at the inner periphery of the cam barrel 65. Bases 70*b* of the cam followers 70*a* of the second lens frame 70 engage the guide holes 67*e* of the forward barrel 67 along the optical axis direction. Thus, the second lens frame 70 is driven forward/backward along the cam groove 65*d* of the cam barrel 65 along the optical axis direction by means of rotation of the forward barrel 67 with respect to the cam barrel 65, and rotation of the cam barrel 65 with respect to the restraining barrel 63. That is, the second lens frame 70 is not moved, with respect to the restraining barrel 63, by the rotation of the forward barrel 67.

A shutter unit 71 is mounted at the second lens frame 71, controlling entry of incident light from the side nearest the object. A flexible printed circuit board 72 connects an actuator 71*a* of the shutter unit 71 and the control circuit of the camera, and is connected to the flexible printed circuit board 51, disposed behind the CCD holder 21, through the lens barrel 2 from the shutter unit 71.

A bias spring 73 is disposed between the second lens frame 70 and the first lens frame 68 to bias the second lens frame 70 and the first lens frame 68 from the optical axis direction. Thus, meshing between the first lens frame 68 and the cam barrel 65, and meshing between the second lens frame 70 and the cam barrel 65 remain intact, stabilizing the optical characteristics.

The motion of the lens barrel 2 from the collapsed state to the photographing state is described in the following.

Figure 13:
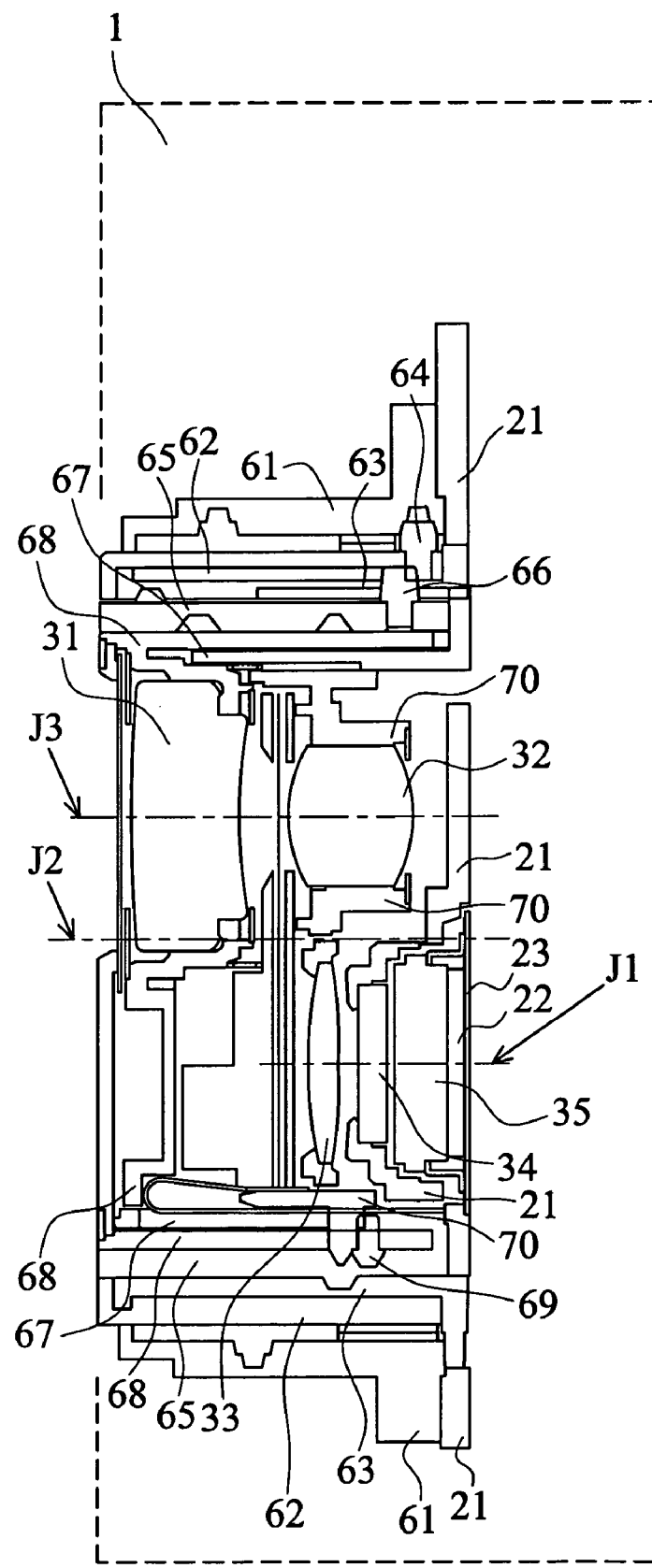
FIG. 13 is a cross section of the lens barrel in a collapsed state.
Figure 14:
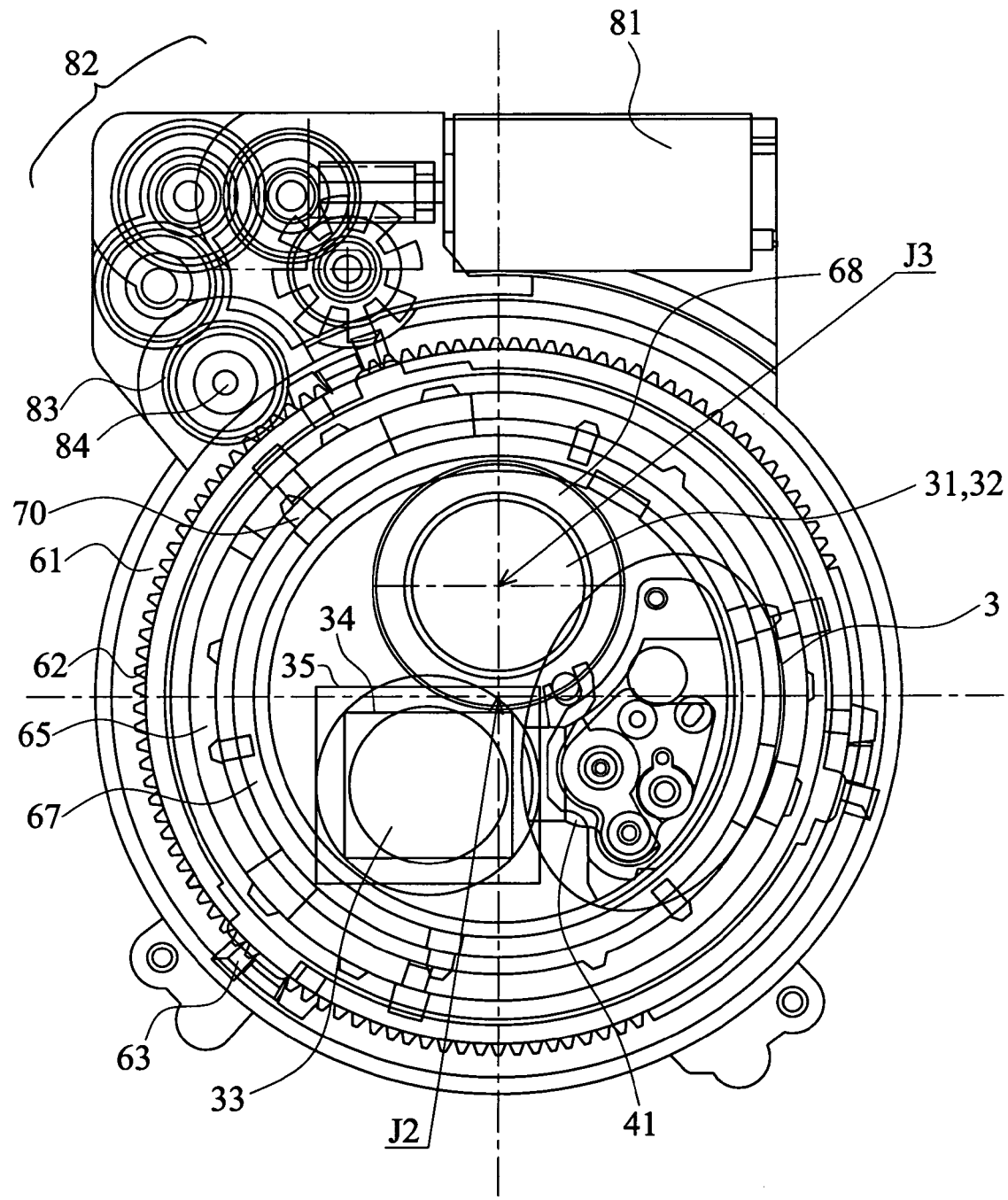
FIG. 14 is a front perspective view of the lens barrel in the collapsed state.
Figure 15:
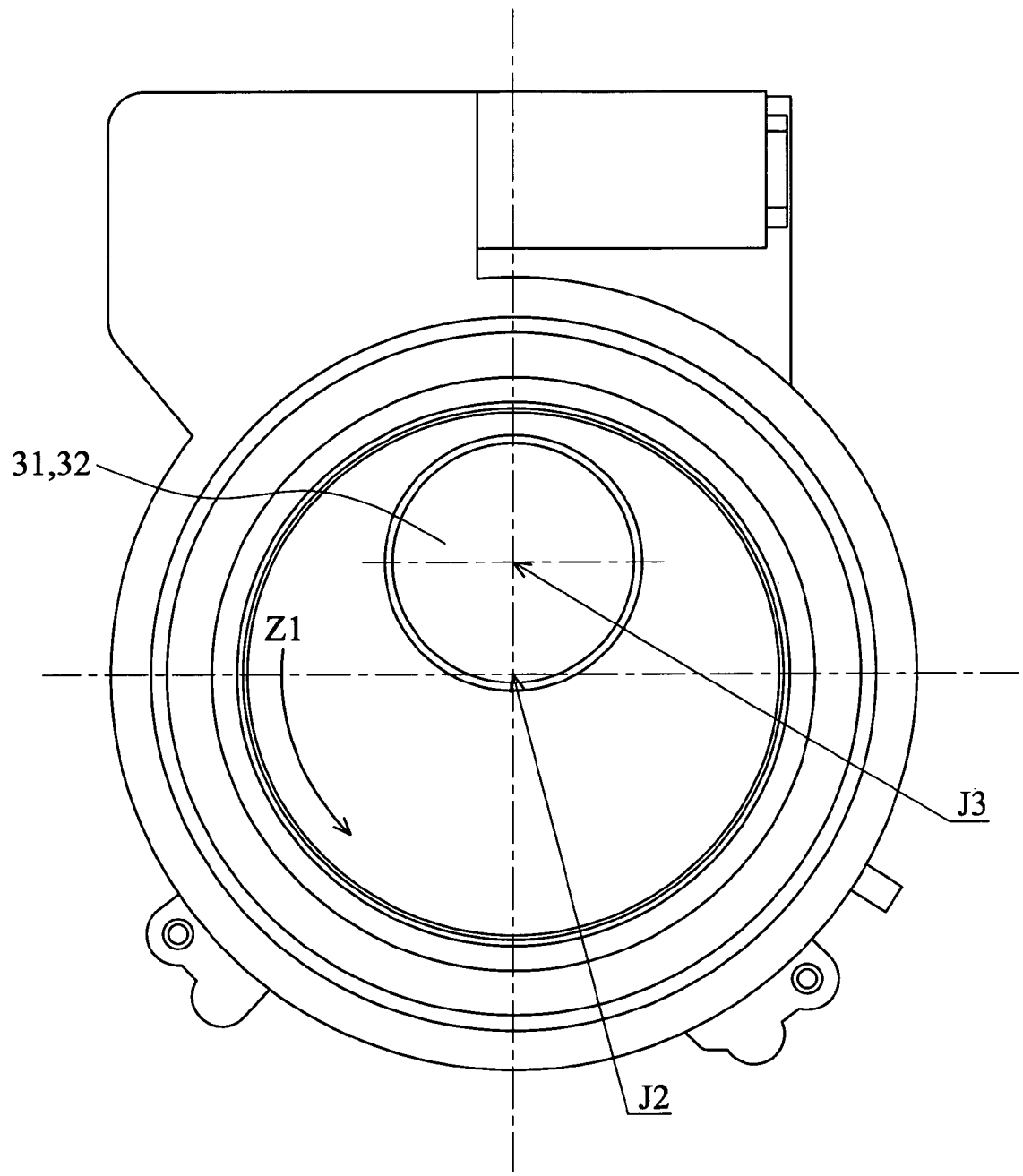
FIG. 15 is a front view of the lens barrel in the collapsed state.

FIG. 13 is a cross section of the lens barrel 2 in the collapsed state. FIG. 14 is a front perspective view of the lens barrel 2 in the collapsed state. J3 represents a central axis of the first and second lens groups 31 and 32. The first and second lens groups 31 and 32 are located at the side of the third lens group 33, the low pass filter 34, the CCD 35, and the focus driving mechanism 3, and away from the optical axis J1. That is, the first and second lens groups 31 and 32, the third lens group 33, the low pass filter 34, the CCD 35, and the focus driving mechanism 3 are substantially received at the same plane perpendicular to the optical axis direction.

Figure 16:
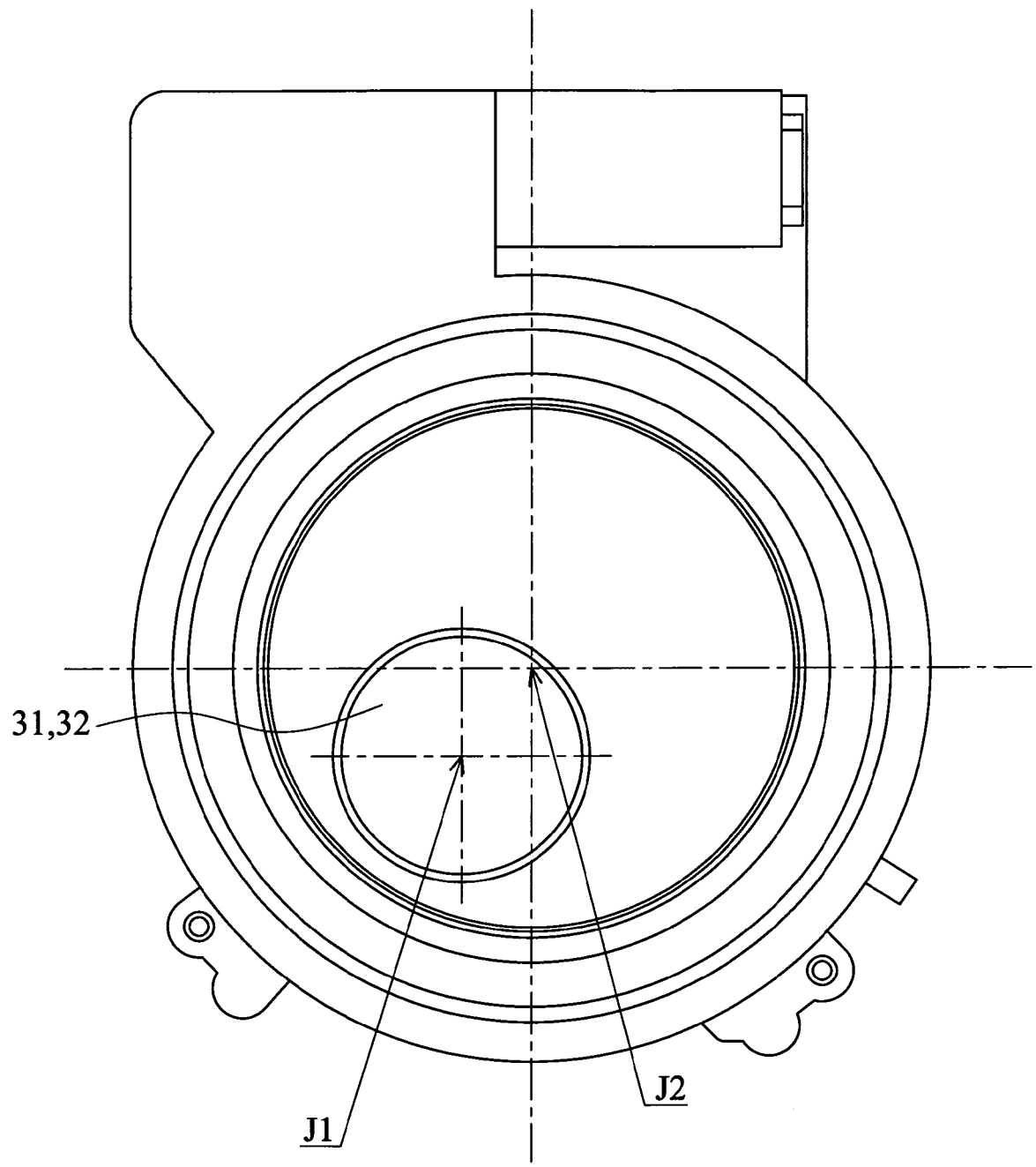
FIG. 16 is a front view of the lens barrel in the photographing state.

When the first and second lens groups 31 and 32 rotate around the central axis J2 of the lens barrel 2, they extend to the photographing state as shown in FIG. 1. As seen from the front side of the lens barrel 2, the first and second lens groups 31 and 32 in FIG. 15 rotates along a direction Z1, and moves to the photographing state as shown in FIG. 16. In the photographing state, since the central axis J3 of the first and second lens groups 31 and 32 is the same as the optical axis J1, an eccentric distance between the central axis J2 of the lens barrel 2 and the optical axis J1 is equal to that between the central axis J2 of the lens barrel 2 and the central axis J3 of the first and second lens groups 31 and 32.

Figure 17:
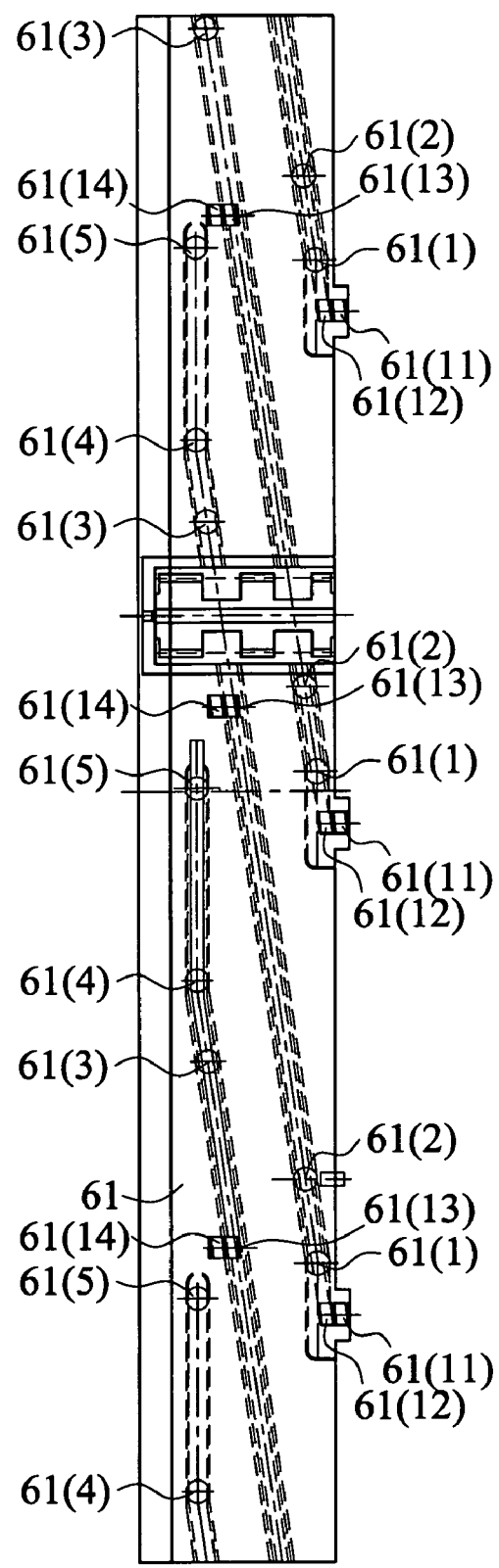
FIG. 17 is a schematic view showing positions of the cam groove of the fixed barrel.
Figure 18:
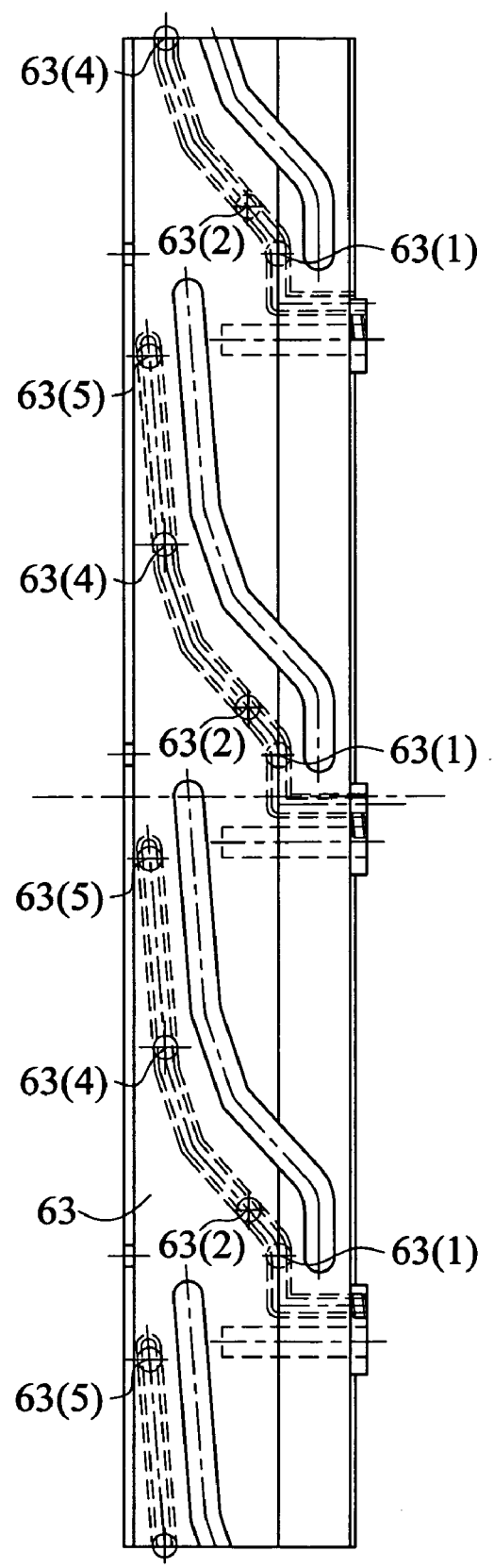
FIG. 18 is a schematic view showing positions of a cam groove of the restraining barrel.
Figure 19:
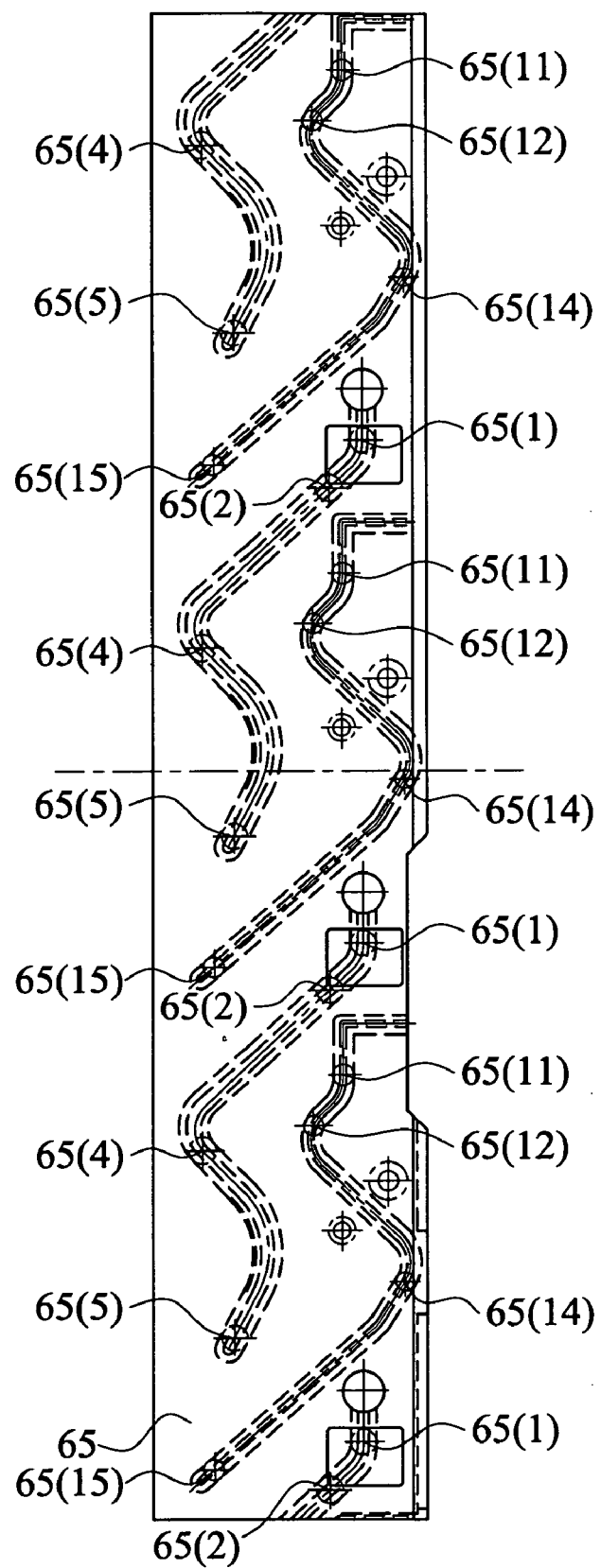
FIG. 19 is a schematic view showing positions of a cam groove of the cam barrel.

Referring to FIGS. 17–19, in the collapsed state of the lens barrel 2, the follower pins 64, inserted into the rotary barrel 62, are in the position 61(1) of the cam groove of the fixed barrel 61. The cam followers 63*b* of the restraining barrel 63 are in the position 61(11) of the cam groove of the fixed barrel 61. The cam followers 65*a* of the cam barrel 65 are in the position 63(1) of the cam groove of the restraining barrel 63. The follower pins 69, inserted into the first lens frame 68, are in the position 65(1) of the cam groove of the cam barrel 65. The cam followers 70*a* of the second lens frame 70 are in the position 65(11) of the cam grooves of the cam barrel 65.

When the rotary barrel 62 rotates around the central axis J2 by means of rotation of the zoom gear 83, the follower pin 64 moves from the position 61(1) of the cam groove of the fixed barrel 61 to the position 61(2), and extends along the optical axis direction. The restraining barrel 63 limits the rotary barrel 62 to move toward the optical axis direction. Since the restraining barrel 63 is guided by the cam groove 61*b* of the fixed barrel 61, it extends from the position 61(11) of the cam groove of the fixed barrel 61 along the position 61(12) in the optical axis direction. When the restraining barrel 63 moves to the position 61(12) from the position 61(11), the cam follower 65*a* of the cam barrel 65 is moved to the position 63(2) from the position 63(1) of the cam groove of the restraining barrel 63 since the restraining barrel 63 is rotated with respect to the rotary barrel 62. At the same time, since the cam barrel 65 rotates with respect to the restraining barrel 63, the follower pin 69 moves to the position 65(2) from the position 65(1) of the cam groove of the cam barrel 65, and the cam follower 70*a* of the second lens frame 70 moves to the position 65(12) from the position 65(11) of the cam groove of the cam barrel 65.

When the follower pin 64 reaches the position 61(2) of the cam groove of the fixed barrel 61, the cam follower 63*b* of the restraining barrel 63 is moved to the position 61(12) of the cam groove of the fixed barrel 61, the cam follower 65*a* of the cam barrel 65 is moved to the position 63(2) of the cam groove of the restraining barrel 63, the follower pin 69 is moved to the position 65(2) of the cam groove of the cam barrel 65, and the cam follower 70*a* of the second lens frame 70 is moved to the position 65(12) of the cam groove of the cam barrel 65.

By means of the above operation, the restraining barrel 63 extends in the optical axis direction. Also, since the cam barrel 65, the first lens frame 68, and the second lens frame 70 extends along the optical axis direction, the first and second lens groups 31 and 32 extends on the side near the object in the optical axis direction.

Before the first and second lens groups 31 and 32 start to rotate, they can move to a position that does not interfere with the third lens group 33, the low pass filter 34, the CCD 35, and the focus driving mechanism 3.

When the follower pin 64 is rotated to the position 61(3) from the position 61(2) of the cam groove of the fixed barrel 61 to extend the rotary barrel 62, the cam follower 63*b* of the restraining barrel 63 reaches the position 61(13) of the cam groove of the fixed barrel 61. The restraining barrel 65 does not rotate with respect to the rotary barrel 62. The cam grooves 61*a* and 61*b* are formed on the fixed barrel 61 to equalize the average amount of extension of the angle of the rotary barrel 62 and that of the restraining barrel 63.

Thus, the rotary barrel 62, the restraining barrel 63, the cam barrel 65, the forward barrel 67, the first lens frame 68, and the second lens frame 70 act integrally, rotating together around the central axis J2 while extending.

When the follower pin 64 passes the position 61(13) of the cam groove of the fixed barrel 61, the rotary barrel 62 is smoothly extended since the cam groove 61b of the fixed barrel 61 is deeper than the cam groove 61a. Specifically, although the follower pin 64 does not engage at the side 61(14) of the cam groove 61a of the fixed barrel 61, the protrusion 62b of the rotary barrel 62 substantially engages with the cam groove 61a of the fixed barrel 61. That is, the follower pin 64 serves as a main guide portion of the cam groove 61a of the fixed barrel 61. The protrusion 62b is preferably formed on the rotary barrel 62 to guide the follower pin 64 through the position 61(13) of the cam groove of the fixed barrel 61. When the protrusion 62b of the rotary barrel 62 substantially engages the cam groove 61a of the fixed barrel 61, it does not overly limit the follower pin 64, affecting the guide function thereof.

When the follower pin 64 reaches the position 61(3) of the cam groove of the fixed barrel 61, and the cam follower 63b of the restraining barrel 63 reaches the position 61(13) of the cam groove of the fixed barrel 61, the optical axis J1 are identical with the central axis J3 of the first and second lens groups 31 and 32.

If the follower pin 64 is continuously rotated to the position 61(4) from the position 61(3) of the cam groove of the fixed barrel 61 to extend the rotary barrel 62, the cam follower 63b of the restraining barrel 63 moves to the position 61(14) from the position 61(13) of the cam groove of the fixed barrel 61 along the optical axis direction, similar to the follower pin 64 moving from the position 61(1) of the cam groove of the fixed barrel 61 to the position 61(2). That is, the restraining barrel 63 rotates with respect to the rotary barrel 62. The cam follower 65a of the cam barrel 65 moves to the position 63(4) from the position 63(2) of the cam groove of the cam barrel 63. The cam barrel 65 rotates with respect to the restraining barrel 63. The follower pin 69 moves to the position 65(4) from the position 65(2) of the cam groove of the cam barrel 65. The cam follower 70a of the second lens frame 70 is driven to the position 65(14) from the position 65(12) of the cam groove of the cam barrel 65, resulting in the photographing state of the lens barrel 2 in minimum zoom state, as shown in FIG. 1.

Zoom operation from the photographing state in minimum zoom state to that in full zoom state is described in the following.

Figure 20:
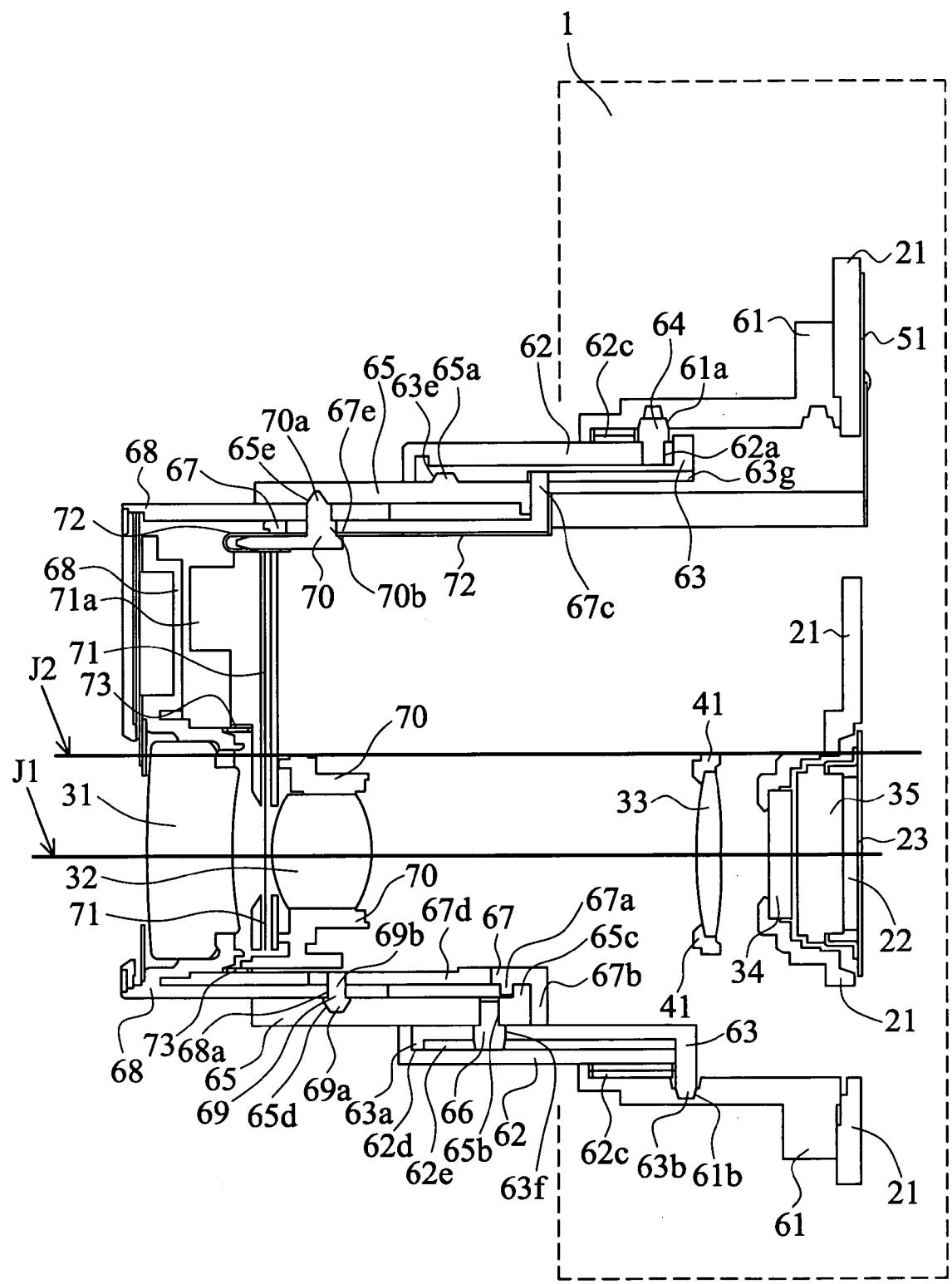
FIG. 20 is a cross section of the lens barrel in the photographing state in full zoom state.

The rotary barrel 62 is rotated by the zoom gear 83, and the follower pin 64 is moved from the position 61(4) of the cam groove of the fixed barrel 61 until it reaches the position 61(5) which represents the photographing state in full zoom state. The position 61(4) represents the photographing state in minimum zoom state. Since the cam groove of the fixed barrel 61 at this range is perpendicular to the optical axis direction, the rotary barrel 62 is not extended along the optical axis direction. Thus, the rotary barrel 62 rotates around the axis J2, and the restraining barrel 63 is stopped. During this motion, since the restraining barrel 63 rotates with respect to the rotary barrel 62, the cam follower 65a of the cam barrel 65 is moved from the position 63(4) of the cam groove of the restraining barrel 63 until it reaches the position 63(5). Additionally, since the cam barrel 65 rotates with respect to the restraining barrel 63, the follower pin 69 is moved from the position 65(4) of the cam groove of the cam barrel 65 until it reaches the position 65(5), and the cam follower 70a of the second lens frame 70 is moved from the position 65(14) of the cam groove of the cam barrel 65 until it reaches the position 65(15). Since the restraining barrel 63 is stopped, the first lens frame 68, supporting the first lens group 31, and the second lens frame 70, supporting the second lens group 32, do not rotate around the central axis J2, but move forward/backward along the optical axis direction. The cam grooves of the cam barrel 65 and the restraining barrel 63 consecutively adjust focal length between the minimum zoom state and the full zoom state. FIG. 20 is a cross section of the lens barrel 2 in the photographing state in full zoom state.

Transition from the photographing state in full zoom state to that in minimum zoom state may be driven by rotating the zoom gear 83 in a reverse direction. The focal length is adjusted by controlling the zoom motor 81 for driving the zoom gear 83. Additionally, transition from the photographing state in minimum zoom state to that in full zoom state may be driven by rotating the zoom gear 83 in a reverse direction to obtain the lens barrel 2 in the collapsed state as shown in FIG. 13.

Figure 21:
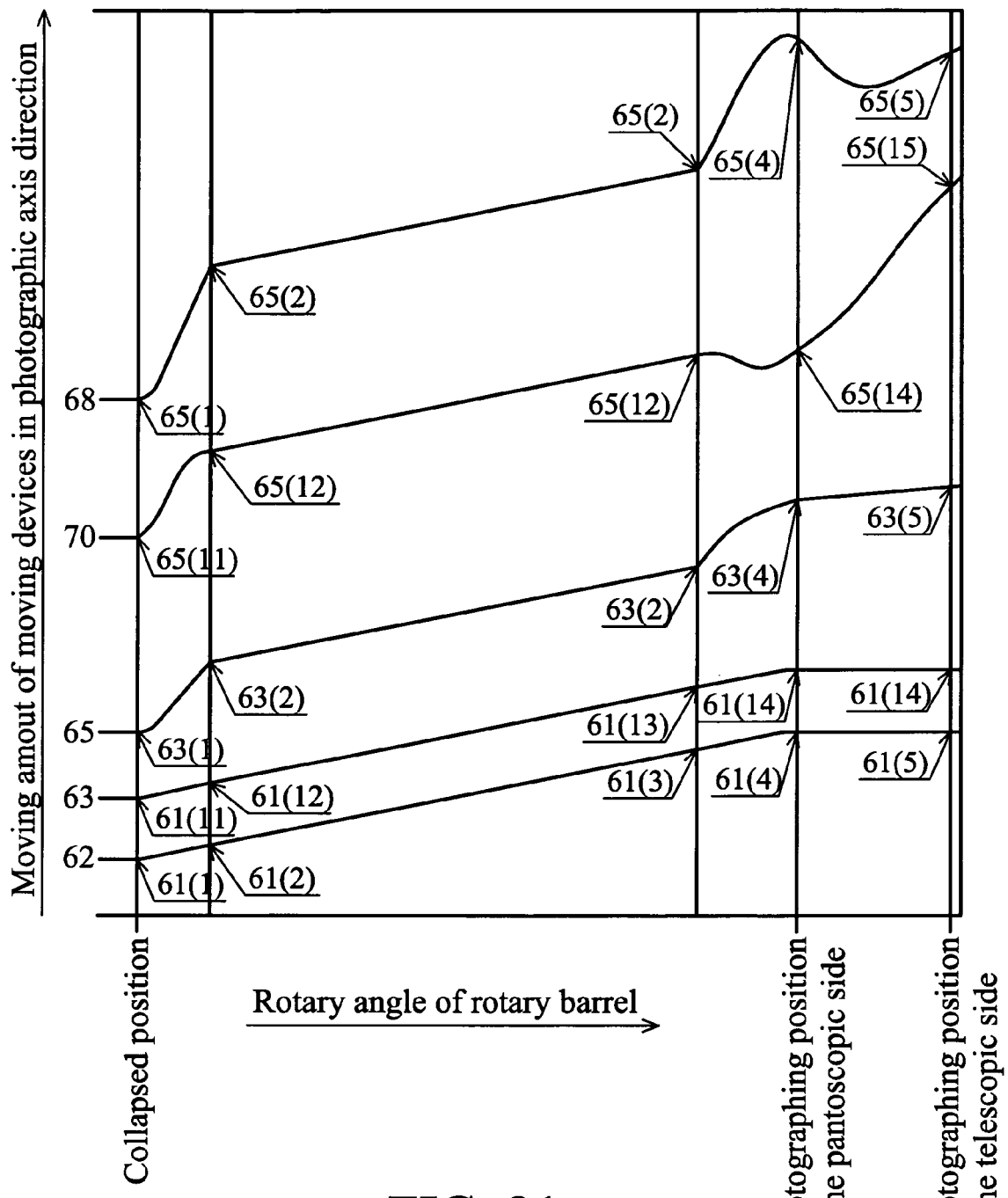
FIG. 21 is a graph showing the relationship between angles of the rotary barrel and distance traveled by moving devices along an optical axis.

FIG. 21 is a graph showing the relationship between angles of the rotary barrel 62 and distance traveled by moving devices of the lens barrel 2 along the optical axis. A transverse axis represents the rotary angle of the rotary barrel 62. A vertical axis represents absolute moving distance to the rotary barrel 62, the restraining barrel 63, the cam barrel 65, the second lens frame 70, and the first lens frame 68 in the optical axis direction. In FIG. 21, positions of the cam groove through which the moving devices pass in FIGS. 17–19 are shown. Distance traveled by the moving devices of the lens barrel 2 along the optical axis direction can be seen in FIG. 21.

Figure 22:
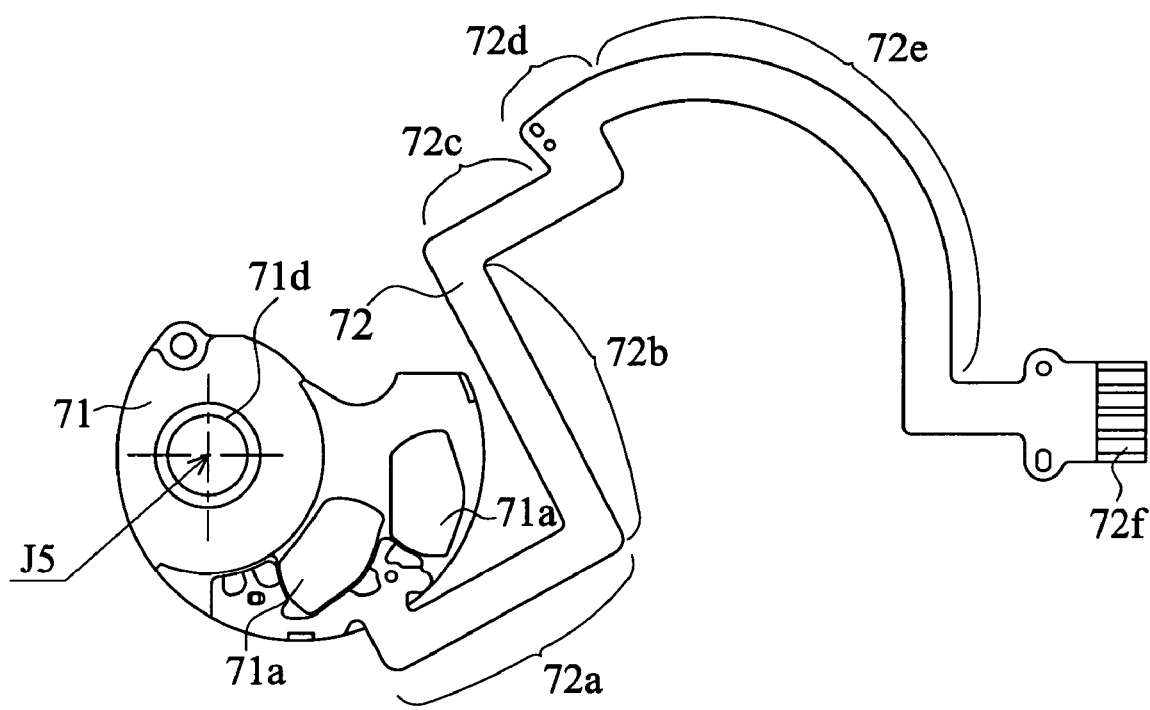
FIG. 22 is a front view of a shutter unit and a flexible printed circuit board.
Figure 23:
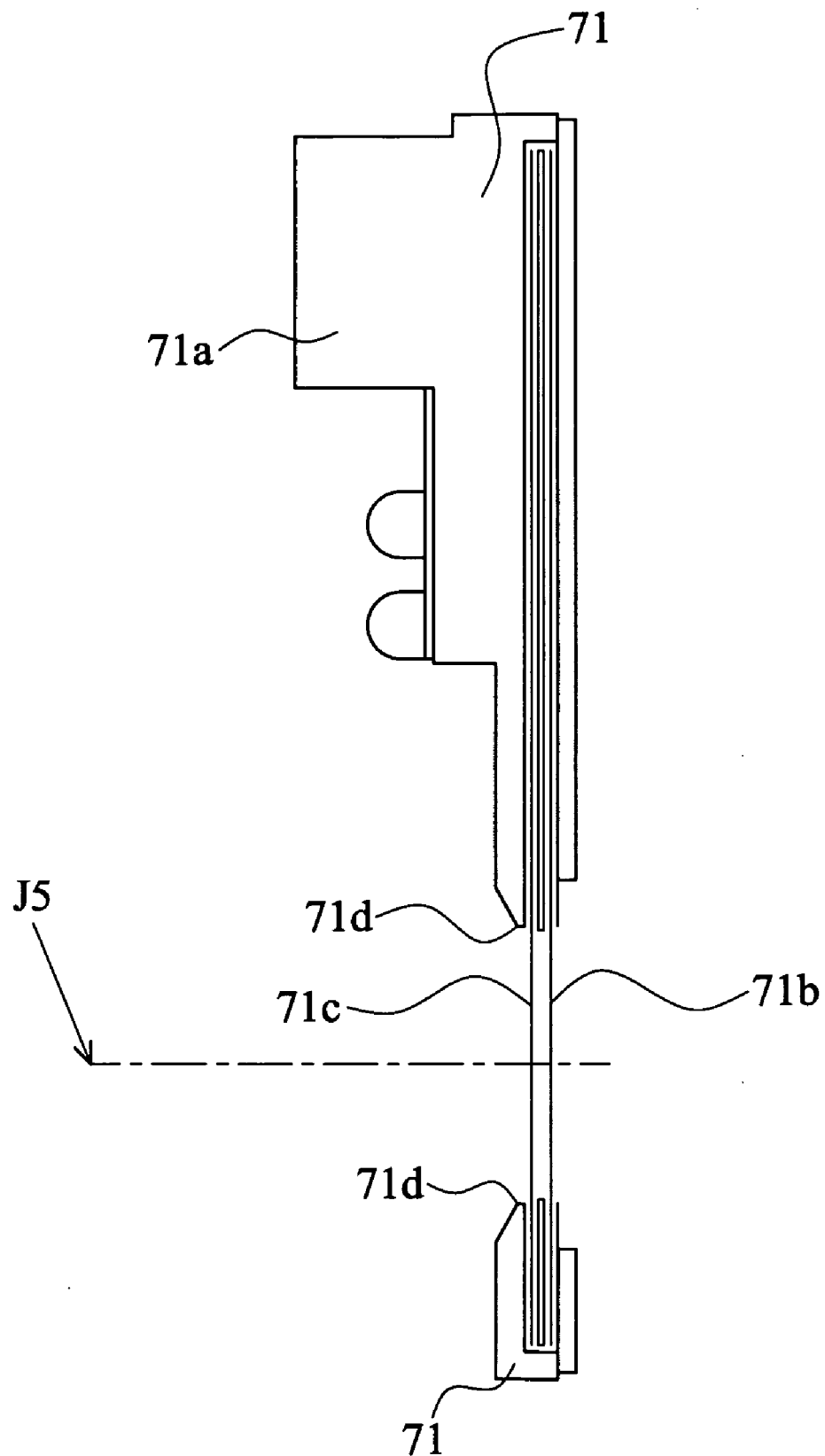
FIG. 23 is a cross section of the shutter unit.

FIG. 22 is a front view of a shutter unit 71 and a flexible printed circuit board 72. In FIG. 22, the flexible printed circuit board 72 is spread out, and is not assembled in the lens barrel 2. FIG. 23 is a cross section of the shutter unit 71 comprising a shutter blade 71b and a diaphragm blade 71c. The shutter blade 71b shields a light from the side of the object. The diaphragm blade 71c restrains the light from the side of the object. An actuator 71a of the shutter unit 71 is connected to the control circuit of the camera via a flexible printed circuit board 72 to drive and control the shutter blade 71b and the diaphragm blade 71c.

Figure 24:
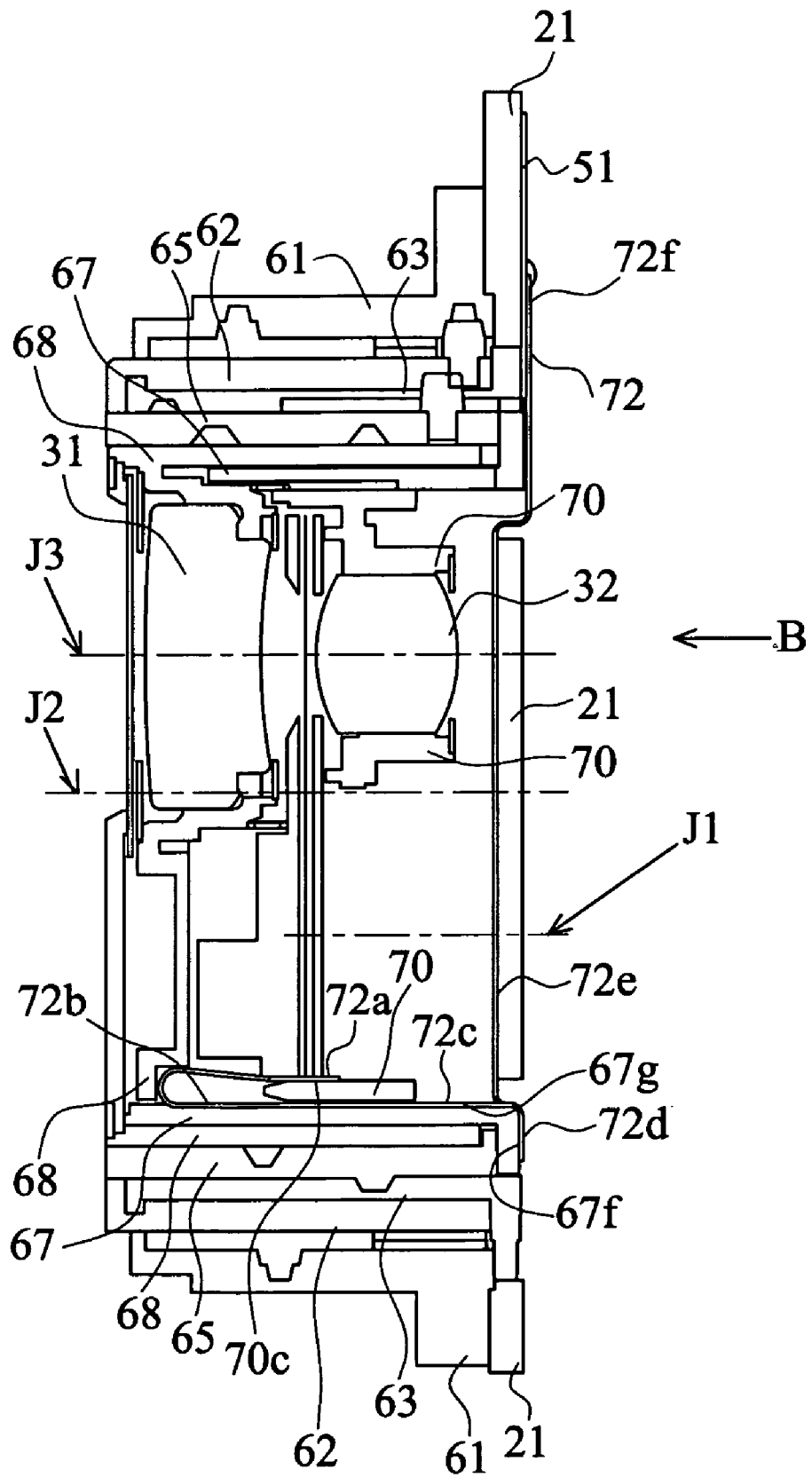
FIG. 24 is a cross section of the lens barrel around the shutter unit in the collapsed state.

FIG. 24 is a cross section of the shutter unit 71 and the flexible printed circuit board 72 of the lens barrel 2 in the collapsed state. The shutter unit 72 is fixed with respect to the second lens frame 70 in a manner such that a central axis J5 of an opening 71d is identical with the central axis J3 of the second lens group 32. A portion 72d of the flexible printed circuit board 72 is fixed to a planar portion 67f of the forward barrel 67 near the CCD holder 21. A portion 72c of the flexible printed circuit board is fixed to an inner portion 67g of the forward barrel 67. A portion 72a of the flexible printed circuit board 72 is fixed to a portion 70c of the second lens frame 70. A portion 72f of the flexible printed circuit board 72 is fixed to the flexible printed circuit board 51 by soldering.

Figure 25:
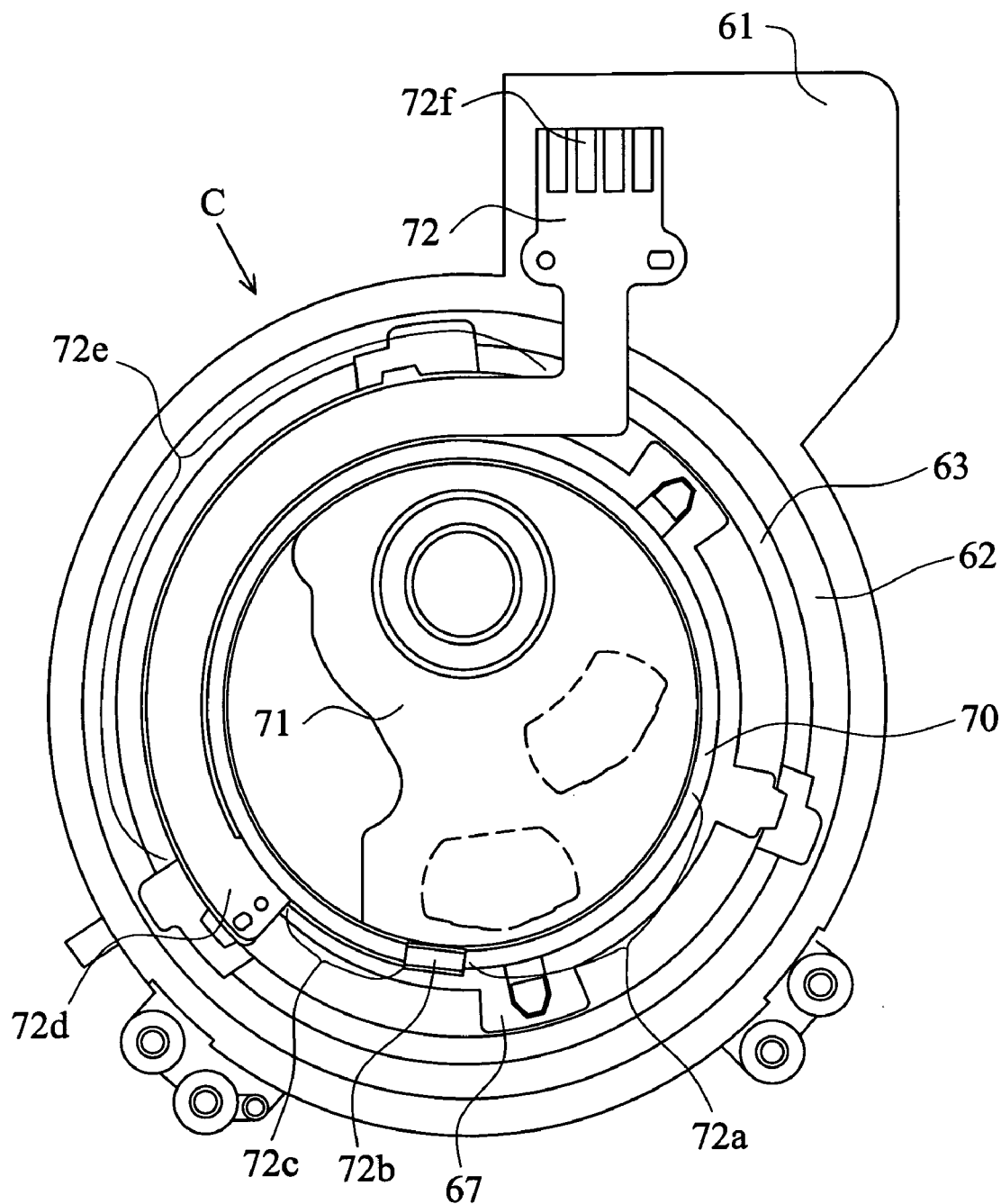
FIG. 25 is a perspective view from an arrow B in FIG. 24.

FIG. 25 is a perspective view of the shutter unit 71 and the flexible printed circuit board 72 from an arrow B in FIG. 24. In FIG. 25, the portions 72a, 72b, 72c, 72d, 72e, and 72f of the flexible printed circuit board 72 in FIG. 22 are in the collapsed state.

The deflection of the flexible printed circuit board 72 in the lens barrel 2 is described in the following. Since the shutter unit 71 is fixed to the second lens frame 70, it can also be driven by the driving mechanism of the lens barrel 2. The forward barrel 67 serves as a restraint member to restrain the rotation of the shutter unit 71 without restraining the movement of the shutter unit 71 in the optical axis direction. That is, the forward barrel 67 brings the shutter unit 71 rotating around the central axis of the lens barrel 2, and restrains the rotation of the shutter unit 71.

Figure 26:
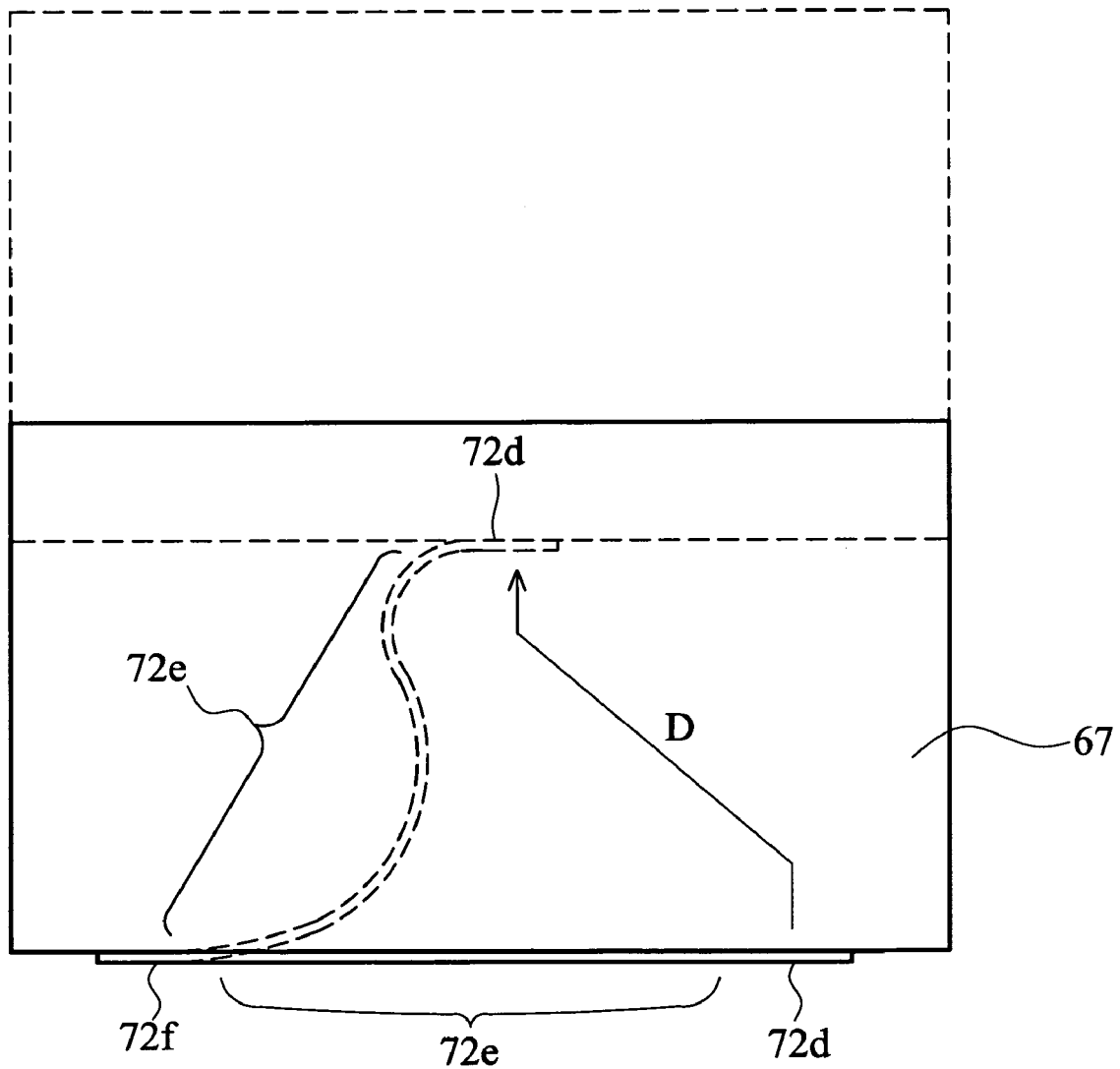
FIG. 26 is a schematic view of the flexible printed circuit board from an arrow C in FIG. 25.

When the lens barrel is extended from the collapsed state to the photographing state in minimum zoom state, the forward barrel 67 and the second lens frame 70 move toward the optical axis direction while rotating around the central axis J2 of the lens barrel 2. Since the portion 72f of the flexible printed circuit board 72 is fixed and the portion 72d thereof is extended along with the forward barrel 67, the portion 72e is deflected in the rotary direction. FIG. 26 is a schematic view of the above motion from an arrow C in FIG. 25. In FIG. 26, the solid line represents the state in the collapsed state, and the dotted line represents the state in the photographing state in minimum zoom state. Since the forward barrel 67 is moved and rotated as shown by arrow D, the portion 72e of the flexible printed circuit board 72 is deflected as shown in FIG. 26 to offset the distance of the movement of the shutter unit 71 in the rotary direction. That is, the portion 72e is bendable so as to provide a variable length for the rotation of the shutter unit 71 around a rotary axis parallel with the optical axis.

Figure 27:
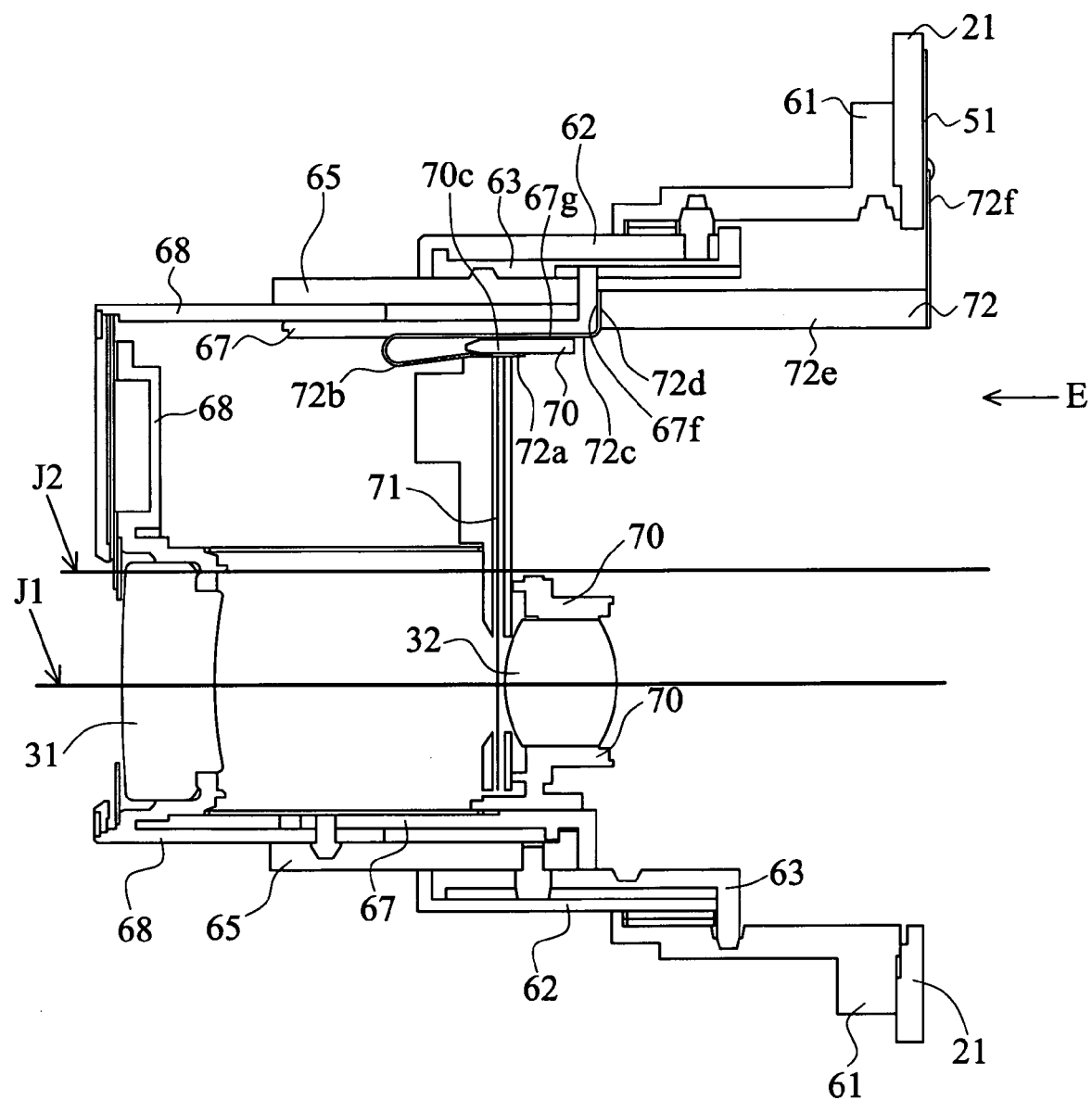
FIG. 27 is a cross section of the lens barrel around the shutter unit in the photographing state in minimum zoom state.
Figure 28:
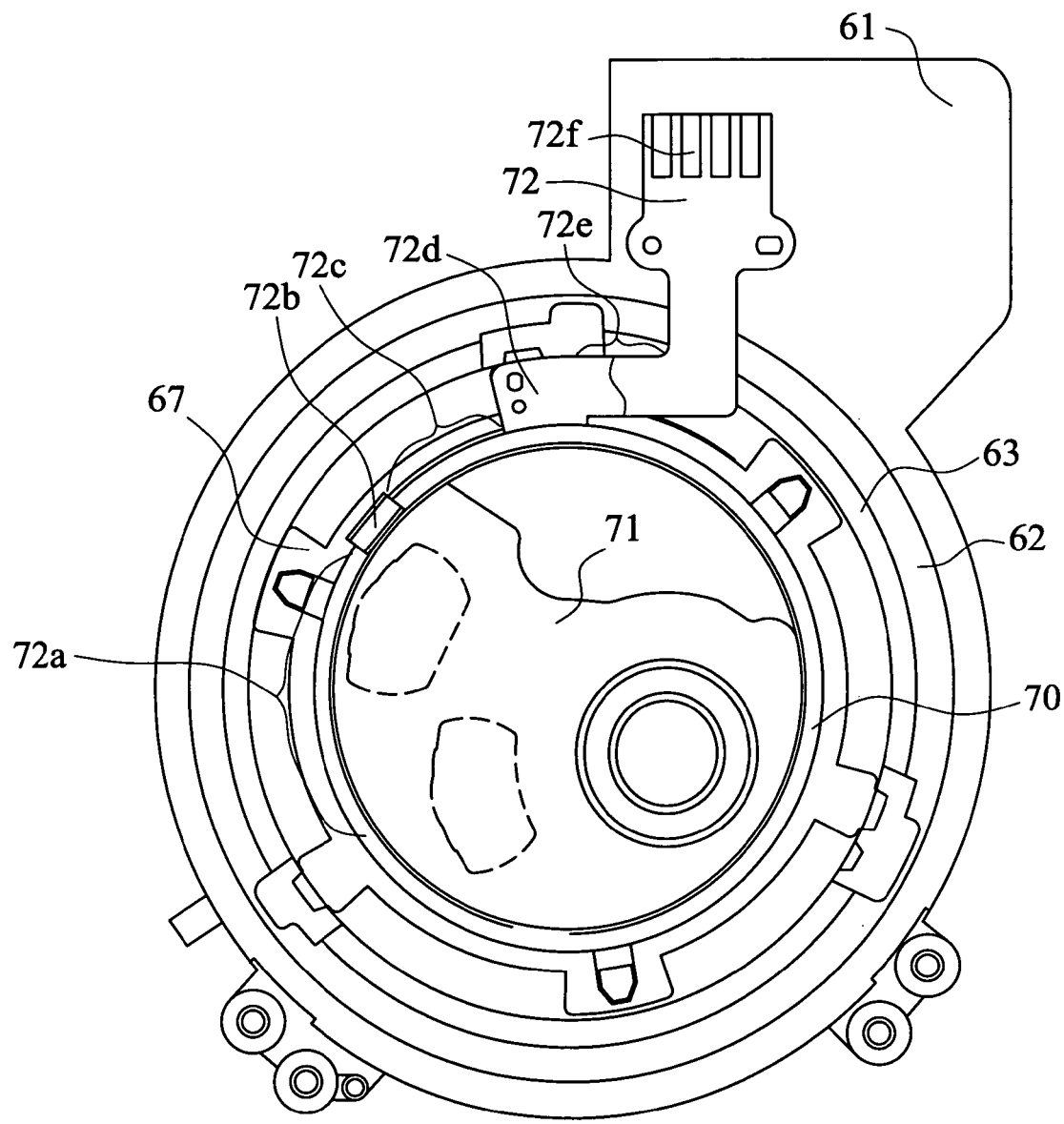
FIG. 28 is a perspective view from an arrow E in FIG. 27.

FIG. 27 is a cross section of the shutter unit 71 and the flexible printed circuit board 72 in the lens barrel 2 in the photographing state in minimum zoom state. FIG. 28 is a perspective view of the shutter unit 71 and the flexible printed circuit board 72 from an arrow E in FIG. 27. When the lens barrel 2 is extended from the collapsed state to the photographing state in minimum zoom state, the second lens frame 70 is moved with respect to the forward barrel 67 in the optical axis direction. Since the portion 72e of the flexible printed circuit board 72 is fixed to the forward barrel 67 and the portion 72a thereof is fixed to the second lens frame 70, the portion 72b is deflected from the state in FIG. 24 to the state in FIG. 27 to offset the distance of the movement of the shutter unit 71 in the optical axis direction. That is, the portion 72b is foldable so as to provide a variable length for the movement of the shutter unit 71 in the optical axis.

Figure 29:
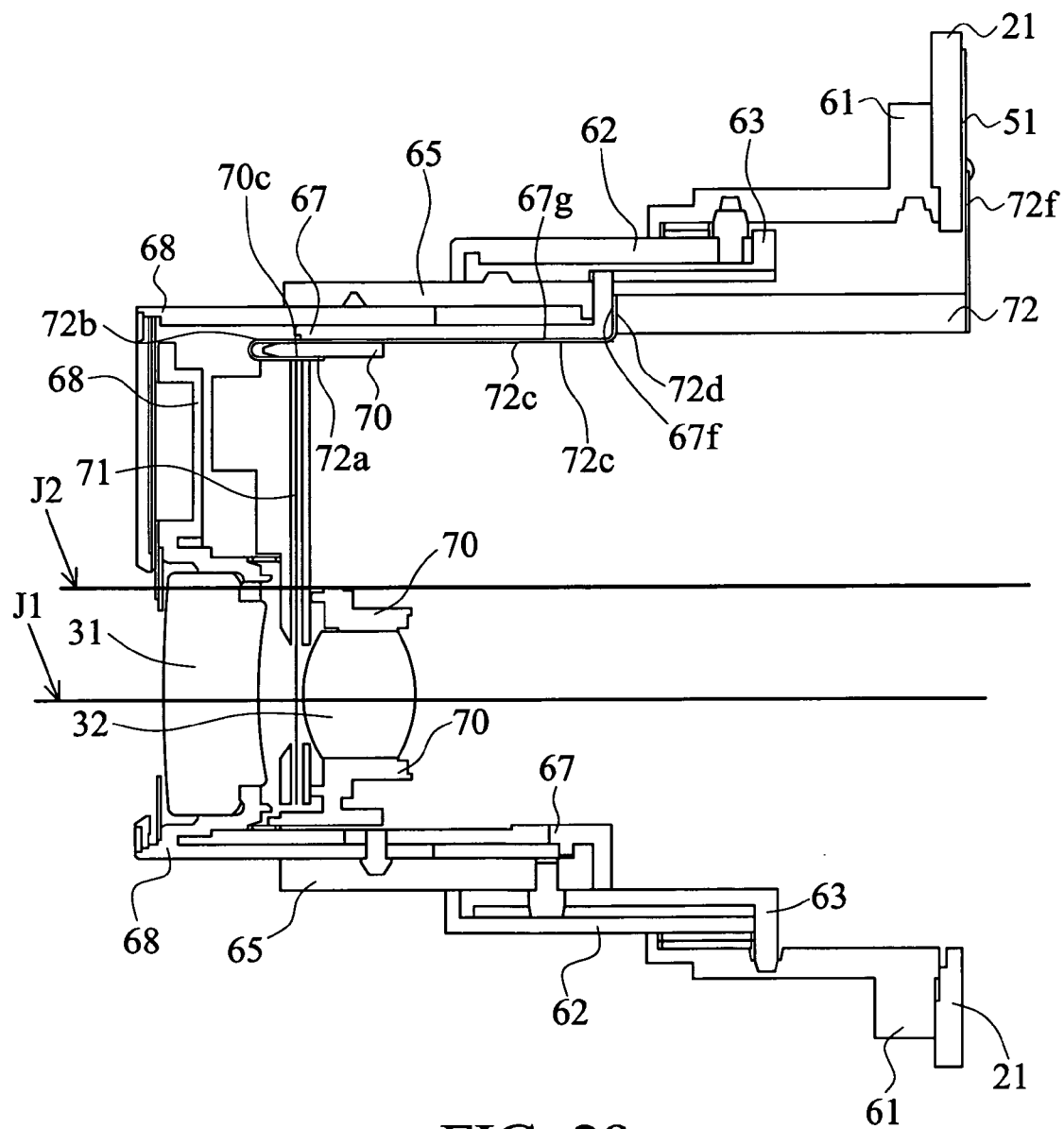
FIG. 29 is a cross section of the lens barrel around the shutter unit in the photographing state in full zoom state.

In the photographing state, when the lens barrel 2 zooms from the minimum zoom state to the full zoom state, the shutter unit 71 fixed to the second lens frame 70 is moved in the optical axis direction with respect to the forward barrel 67. FIG. 29 is a cross section of the shutter unit 71 and the flexible printed circuit board 72 in the lens barrel 2 in the photographing state in full zoom state. During zooming, the portion 72b of the flexible printed circuit board 72 is deflected from the state in FIG. 27 to the state in FIG. 29 to offset the distance of the movement of the shutter unit 71 in the optical axis direction.

As previously described, when the shutter unit 71 is rotated around the central axis J2 of the lens barrel 2, its movement is offset by the deflection of the portion 72e of the flexible circuit board 72. When the shutter unit 71 is moved in the optical axis direction with respect to the forward barrel 67, its movement is offset by the deflection of the portion 72b of the flexible circuit board 72.

Since the second lens frame 70 and the shutter unit 71 can be rotated around the central axis of the lens barrel 2 such that the lens barrel 2 is collapsed, a thinner lens barrel can be obtained.

While the lens barrel is described as above, it is not limited thereto, and may include various embodiments.

For example, while the central axis J2 of the lens barrel 2 is eccentric from the optical axis J1 in this embodiment, it is not limited thereto, and may be identical.

While the portions 72c and 72d of the flexible printed circuit board 72 are fixed to the forward barrel 67 in this embodiment, they are not limited thereto, and may be fixed to the restraint barrel 63 that is also a restraint member for the shutter unit 71.

While the shutter unit 71 is fixed to the second lens frame 70 in this embodiment, it is not limited thereto, and may be fixed to another lens frame. Moreover, the shutter unit may rotate and move independently.

While the lens barrel is provided with a zooming function in this embodiment, it is not limited thereto, and may not be provided with zooming motion, such as a single focus lens barrel.

Since the shutter unit moves freely in the lens barrel, a thinner camera with good portability can be obtained. Thus, such a lens barrel can be widely applied in the digital cameras.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens barrel comprising:
    a shutter unit comprising a shutter blade and an actuator;
    a driving mechanism driving the shutter unit to move along an optical axis and rotate around a rotary axis parallel with the optical axis in the lens barrel; and
    a flexible printed circuit board, comprising a first flexible portion and a second flexible portion, connecting the actuator of the shutter unit and a driving circuit outside the lens barrel, wherein the first flexible portion is foldable so as to provide a first variable length for the movement of the shutter unit in the optical axis, and the second flexible portion is bendable so as to provide a second variable length for the rotation of the shutter unit around the rotary axis parallel with the optical axis.

2. The lens barrel as claimed in claim 1, further comprising a restraint member bringing the shutter unit rotating around a central axis of the lens barrel and restraining the rotation of the shutter unit.

3. The lens barrel as claimed in claim 2, wherein the flexible printed circuit board further comprises a central portion located between the first flexible portion and the second flexible portion, and the central portion is fixed to the restraint member.

4. The lens barrel as claimed in claim 1, wherein the lens barrel is retracted to obtain a collapsed state or advanced to obtain a photographing state, the shutter unit is moved and rotated by the driving mechanism when the lens barrel is operated from the collapsed state to the photographing state, and is simply moved when the lens barrel is operated in the photographing state.

5. The lens barrel as claimed in claim 4, further comprising a restraint member bringing the shutter unit rotating around a central axis of the lens barrel and restraining the rotation of the shutter unit.

6. The lens barrel as claimed in claim 5, wherein the flexible printed circuit board further comprises a central portion located between the first flexible portion and the second flexible portion, and the central portion is fixed to the restraint member.

* * * * *